United States Patent
Kakaratsios

(10) Patent No.: US 12,337,552 B2
(45) Date of Patent: Jun. 24, 2025

(54) VACUUM APPARATUS AND METHOD

(71) Applicant: Spirit AeroSystems (Europe) Limited, London (GB)

(72) Inventor: Zacharias Kakaratsios, London (GB)

(73) Assignee: Spirit AeroSystems (Europe) Limited, London (GB)

( * ) Notice: Subject to any disclaimer, the term of this patent is extended or adjusted under 35 U.S.C. 154(b) by 225 days.

(21) Appl. No.: 17/777,806

(22) PCT Filed: Nov. 11, 2020

(86) PCT No.: PCT/GB2020/052857
§ 371 (c)(1),
(2) Date: May 18, 2022

(87) PCT Pub. No.: WO2021/099763
PCT Pub. Date: May 27, 2021

(65) Prior Publication Data
US 2022/0410508 A1   Dec. 29, 2022

(30) Foreign Application Priority Data

Nov. 21, 2019   (GB) .................................. 1916987

(51) Int. Cl.
*B29C 70/44*   (2006.01)
*B29C 70/34*   (2006.01)

(52) U.S. Cl.
CPC .......... *B29C 70/443* (2013.01); *B29C 70/342* (2013.01); *B29C 2791/006* (2013.01)

(58) Field of Classification Search
CPC ................ B29C 70/443; B29C 70/342; B29C 2791/006; B29C 70/548; B29C 37/0064; B29C 33/0061
See application file for complete search history.

(56) References Cited

U.S. PATENT DOCUMENTS

| | | | |
|---|---|---|---|
| 7,147,818 B1 * | 12/2006 | Rigas | B29C 70/443 264/102 |
| 2004/0145095 A1 * | 7/2004 | McCollum | B29C 70/443 264/258 |
| 2018/0079115 A1 * | 3/2018 | Aquino | B29C 70/548 |

FOREIGN PATENT DOCUMENTS

| | | |
|---|---|---|
| WO | 9114564 A1 | 10/1991 |
| WO | 2015026227 A1 | 2/2015 |

OTHER PUBLICATIONS

International Search Report and Written Opinion dated Jan. 29, 2021 for related PCT Patent Application No. PCT/GB2020/052857 which was filed on Nov. 11, 2020; 14 pages.

* cited by examiner

*Primary Examiner* — Michael A Tolin
*Assistant Examiner* — Hana C Page
(74) *Attorney, Agent, or Firm* — Stinson LLP

(57) ABSTRACT

Disclosed is a vacuum apparatus for applying a vacuum to a reinforcement lay-up during in composite manufacture, and a method of use. The vacuum apparatus comprises a vacuum port component (100) having body portion (102) defining a contact surface (104) and an internal cavity. A vacuum port (108) for connection to a vacuum pump is oriented away from the contact surface communicates with the internal cavity. The vacuum port component can be connected to vacuum component (200) body portion also defining a contact surface and an internal cavity (207), and further comprising a plurality of inlet apertures or slots (206) extending therethrough and in communication with the vacuum component internal cavity.

13 Claims, 13 Drawing Sheets

VACUUM APPARATUS AND METHOD

FIELD OF THE INVENTION

The invention relates to the field of composite manufacture, and in particular apparatus and methods for achieving a high and uniform fibre volume fraction in vacuum assisted resin infusion manufacturing of composite parts.

BACKGROUND TO THE INVENTION

Composite materials are widely used in a number of industries, such as aerospace, automotive, civil engineering and sports goods, due to their high strength-to-weight ratio.

Composite materials such as carbon fibre composite and fibreglass composite can be constituted from multiple plies or layers of reinforcement fabric impregnated with a flowable matrix such as a curable resin, or any flowable matrix such as polymeric matrix or a thermoplastics material. For example, carbon fibre is formed by carbonizing synthetic polymer fibre and may be provided in the form of woven fabric, non-woven fabric or may consist of unidirectional fibre, tows or tapes. Similar composites may be formed using alternative reinforcement materials such as a glass fibres, synthetic polymer fibres (e.g. aramid), natural fibres (e.g. cellulose), or combinations of such materials.

In the aerospace industry in particular, there has been increasing adoption of so called "out of autoclave" (OOA) infusion processing methods. The initial and operating costs for the OOA processing are significantly reduced compared to autoclave processing methods.

In such methods, a dry reinforcement material is deposited (or "laid-up") on a tooling surface, for example in layers of a reinforcement fabric material, and the resulting reinforcement lay-up sealed within a so called "vacuum bag" (typically a flexible or semi-flexible sheet placed over the reinforcement lay-up and sealed against the tooling surface) and then compressed by reducing pressure under the vacuum bag.

The reinforcement material can commonly include a binder, and once compressed, the reinforcement lay-up can retain the shape of the tooling surface. A dry reinforcement with some degree of structural integrity and a shape roughly corresponding to the tooling surface (and thus the composite article that will ultimately be formed), is commonly referred to as a "pre-form".

Some degree of pre-forming may also occur in the absence of any binder, due to friction between fibrous reinforcement material, or fabric layers.

Matrix material, such as a resin is infused into the reinforcement or dry pre-from from a feed reservoir containing the matrix material (typically an uncured polymeric resin). This is normally driven by the pressure differential between the feed reservoir and the reduced pressure in the vacuum bag.

The distribution of the resin during the infusion process must be carefully controlled to ensure that the laminate is as evenly and fully saturated as possible. This is achieved using a highly permeable resin distribution media commonly known as "flow media" placed above or below the laminate. The resin inlet or inlets communicate with the flow media, whilst the vacuum line or lines communicate with the laminate itself or a sacrificial resin permeable material. This arrangement ensures that resin preferentially diffuses throughout the flow media and is then drawn through the relatively low-permeability laminate towards the vacuum line(s).

FIG. 1 is a schematic cross sectional side view of a typical through thickness resin infusion set-up. On a tool 10, is placed a flow media 12 (formed from a plastics mesh material or the like) and a porous or perforated caul plate 14 is placed over the flow media. A dry pre-form or layers of dry reinforcement are laid up or deposited on the caul plate to form the dry reinforcement lay-up 16 that will later be infused. A flexible (typically nylon) vacuum bag 18 is placed over the laminate (separated therefrom by a caul plate 20, typically a rubber pad and flow media. The bag 18 is sealed to the tool 10 around the periphery. Various adhesive tape layer, intensifier or release film layers may also be used, but these are omitted form the figure for clarity.

A resin feed reservoir 22 is connected to a resin inlet 24 to the vacuum bag via an inlet line 26 and a nozzle (not shown). An inlet valve 27 is positioned in the inlet line 26 to regulate flow through the inlet line. The inlet 24 communicates directly with the flow media 12.

A single inlet line and inlet is depicted, although multiple inlets may be required in certain cases, optionally via pre-moulded channels in the underside of the vacuum bag itself.

A vacuum pump 28 is similarly connected to an outlet 30 from the vacuum bag via a vacuum line 32 and an optional resin catch pot 34 (to prevent any resin entering the vacuum line from reaching and damaging the pump). An outlet valve 35 is positioned in the outlet line 32. In the embodiment shown, the outlet 30 communicates directly with a sacrificial portion of the reinforcement lay-up 36. The sacrificial portion 36 and outlet 30 are separated from the rest of the reinforcement material by a "dead zone" 38. This optional arrangement reduces the likelihood of resin flowing to the outlet in use, bypassing areas of the reinforcement.

Multiple outlets and vacuum lines may be present in some circumstances. It should also be appreciated that the sequence of layers may vary. For example, a flow media may be placed above a reinforcement lay-up and/or the reinforcement material may be separated from flow media by alternative porous layers, such as a peel ply.

In a conventional vacuum assisted resin transfer moulding (VARTM) process, with the inlet valve 27 closed and the outlet valve 35 open, the vacuum pump 28 is activated and air pumped from the vacuum bag. Over time, the pressure throughout the items in the bag equalises to the pressure in the vacuum line 32, normally a fraction of the ambient pressure (e.g. less than around 15%, 10% or in some applications around 1% of ambient pressure).

In this state, due to the pressure differential between the inside and the outside of the bag, the reinforcement lay-up 16 is compressed. It should be noted that this process is conventionally used at various stages during the course of laying up the reinforcement material, to de-bulk the reinforcement material.

The inlet valve is then opened, such that resin is transferred from the reservoir 22 through the inlet 24. Resin flows comparatively freely through the flow media 12 and then infuses through the caul plate 14 (where present) and into the reinforcement lay-up 16 across the face of the tool 10.

When the reinforcement lay-up 16 is fully saturated, the valves 27 and 35 are closed and the infused reinforcement is cured either naturally or with the application of heat.

For manufacture of larger or more geometrically complex composite parts using VATRM processes, there may be additional challenges in achieving required saturation and part thickness uniformity across the entire part.

Different regions of a reinforcement lay-up may have different thicknesses and ply configurations leading to complex combined permeability characteristics, such that matrix material may flow at different rates in different regions during infusion. This may result in part thickness variation, resulting from over-saturated (resin rich) and/or localised under-saturated (dry) regions of the infused part.

Hard tooling or stiffening elements may be required within or against the lay-up (for example to ensure precise dimensional tolerances), and these can under some circumstances lead to "race tracking" of resin or matrix material along the boundaries with the reinforcement material. Where this occurs, resin can by-pass the lay-up and may also lead to localised part dryness.

Such issues may be addressed by careful placement of vacuum ports, across the part surface, positioned for example to modify the shape of the flow front of the matrix material for example by providing multiple inlets and gating the inlet opening sequence.

Installing vacuum ports and lines can be time consuming and costly, particularly for larger parts, where a large number of outlets may be required. In addition, each vacuum port and each vacuum line connection in the system represents a potential source of leakage, and thus the potential for rejection if required specifications are not met. Vacuum ports if in direct contact with the infused part are also prone to cause surface imperfections which may require post-curing removal or machining.

The shape of the flow front can be also be modified by adapting the configuration of the flow media, and/or by incorporating in the reinforcement lay-up additional sacrificial "dead zones" (which are later removed), to allow the resin to continue to progress past higher permeability regions, and allow the flow front to progress through lower permeability regions. However, such arrangements are not always practicable to implement and at best necessitate additional processing, material and tooling costs.

Accordingly, there remains a need for improvements to resin infusion during composite manufacture to provide additional control over the resin distribution, particularly in relation to relatively large and/or geometrically complex components and for high-performance applications such as the manufacture of aerospace components.

SUMMARY OF THE INVENTION

According to a first aspect of the invention there is provided vacuum apparatus for applying a vacuum to a reinforcement lay-up. The apparatus is for use in composite manufacture, for example in a VARTM processes.

The vacuum apparatus includes:
a vacuum port component having a vacuum port component body portion defining a contact surface and an internal cavity, the vacuum port component further comprising a vacuum port oriented away from the contact surface and in communication with the vacuum port component internal cavity;
a vacuum component having a vacuum component body portion defining a contact surface and an internal cavity; wherein the vacuum component contact surface comprises a plurality of inlet apertures or one or more inlet slots extending therethrough and in communication with the vacuum component internal cavity;
the vacuum port component and the vacuum component being connected or connectable to one another to place the respective internal cavities in fluid communication with one another.

In a vacuum assisted infusion process, the vacuum apparatus may be placed within a vacuum bag, against a reinforcement lay-up with the contact surfaces against the reinforcement material (or a permeable peel ply itself applied to the reinforcement material). The vacuum port of the vacuum port component may be coupled to a vacuum system (such as a vacuum pump, via a vacuum line) via an aperture in the vacuum bag. The (or each) slot, or the apertures, enable a vacuum to be applied to the reinforcement material across the area of the (or each) contact surface, via a single vacuum connection.

The contact surface of the vacuum port component may also comprise a plurality of inlet apertures or one or more inlet slots extending therethrough and in communication with the vacuum port component internal cavity.

The vacuum port component and the vacuum component may be connectable so as to place the respective contact surfaces in alignment with one another, for example coplanar or sharing a common curvature.

The vacuum port component and the vacuum component may be connectable so as to provide a contiguous vacuum apparatus contact surface.

Each contact surface may be generally planar, and when the vacuum port component and the vacuum component are connected, the respective contact surfaces may be co-planar.

It should be understood, however, that one or more components of the vacuum apparatus may have a degree of compliancy (for example may be formed from a relatively flexible material such as a plastics material) such that deviations from alignment or coplanarity may be accommodated.

The vacuum port component and the vacuum component may be connectable via a connector arrangement, the connector arrangement having a channel therethrough, and by which the respective internal cavities may placed in fluid communication, when the vacuum port component and the vacuum component are connected to one another.

Each of the vacuum port component and the vacuum component may comprise a connector sub-arrangement, having one or more connectors, and being connectable to another connector sub-arrangement to form the connection arrangement.

Suitable connectors may include male and female connectors, such as plug and socket arrangements. The vacuum port component may include a male or a female connector, and the vacuum component may include the other of a male and a female connector, each male and female connector having a channel therethrough.

Each connector sub-arrangement may include more than one of each of a male connector and a female connector. The connection arrangement may include other male and female connectors for securing and aligning the vacuum port and vacuum components to one another.

The connection arrangement is typically releasable, such that the components are releasably couplable to one another.

The vacuum port and vacuum components are desirably connectable to one another to provide a gas-tight, or substantially gas-tight seal, under the pressure differentials encountered in infusion processes (typically up to around one atmosphere).

A gas-tight seal may be achieved by way of an interference fit, or a deformable seal such as a resilient member (e.g. an O-ring) or by application of a grease or sealant material during connection.

In some embodiments, the connection arrangement "self-seals" in use, due to thermal expansion and/or dimensional changes when a vacuum is applied. Such arrangement obviates the requirement for additional parts, materials or assembly steps.

Cooperative engagement between connectors may for example become gas-tight at the temperatures used for infusion, or due to pressure differentials between the outside of the respective bodies and the internal cavities.

The materials from which the connection sub-arrangements, or optionally the entire vacuum port component and/or vacuum component are formed may promote such "self-sealing". For example, a relatively soft material, such as a silicone or other plastics material may be employed.

In some embodiments, the body portion or the entire of said vacuum port component and/or vacuum component may be formed from such materials. For example, such components may benefit from for ease of manufacture (e.g. by moulding or extrusion) and may provide a degree of compliancy with the surface of the reinforcement lay-up, in use.

The vacuum port component body portion and/or the vacuum component body portion, and thus the corresponding contact surface, may be elongate. The respective internal cavity may take the form of an (elongate) internal channel. The elongate contact surface, for example of an elongate vacuum component, may thus be configured to be placed along an edge or vertex of a reinforcement lay-up.

An elongate body portion may be convenient to manufacture (e.g. by extrusion of a plastics material). An elongate body may also be cut to length, as required. Particularly in the context of a modular apparatus (i.e. comprising at least one vacuum port component and at least one vacuum component), elongate body portions may be the most versatile, and may for example be applied to a relatively large flat surface region of a reinforcement lay-up, as well as along narrower ridges or around edges or a reinforcement layup, i.e. such as integrated (co-infused/co-cured) stiffening elements and the like.

In use, a contact surface may be placed directly on the reinforcement lay-up. For example, the (or each) body may be moulded or cast from a material and the portion of the body defining the contact surface may be placed directly on the reinforcement lay-up.

Optionally, one or more additional material layers may be used between the contact surface and the reinforcement material.

As mentioned above, a (permeable) peel ply may extend across the reinforcement lay-up and the contact surface may be placed on the peel ply.

Alternatively, or in addition, at least one said contact surface may comprise one or more additional material layer applied thereto. Such additional material layers applied to the contact surface may have substantially the same shape as the contact surface.

The one or more additional material layers applied to the (or each) contact surface may comprise a mild adhesive layer and/or a peel ply. The mild adhesive layer may be provided with one or more slots or apertures therethrough, to correspond to those in the vacuum port contact surface and/or vacuum component contact surface, as the case may be.

The one or more additional material layers applied to the (or each) contact surface may comprise a semi-permeable membrane.

Expanded polymer membranes may be formed by heating and expanding a polymeric material (such as a sheet or tape) so as to "fracture" the polymeric material structure and form microscopic pores or channels in the membrane material. The expanded polymeric membrane may be selectively permeable, so as to allow passage of gas, but substantially prevent passage of fluid, such as the matrix material infused into the reinforcement material.

Any suitable semi-permeable material layer may be used, and a wide variety of such materials are known in the art, including but not limited to expanded polymers such as fluoropolymers (e.g. expanded polytetrafluoroethylene) or expanded polythene or expanded polyurethane or the like.

A semi-permeable membrane may advantageously prevent ingress of matrix material into the internal cavity of the vacuum port component and/or the vacuum component. Even after a flow front has reached one region of a said semi-permeable membrane, vacuum can still be applied elsewhere; thereby allowing the evacuation of entrapped air and infusion of void areas. Ingress of matrix material into the internal cavity might in some circumstances otherwise restrict, or isolate regions of the internal cavity from the vacuum port and create so-called vacuum "lock-off", and tend to cause dry regions of the reinforcement lay-up. In addition, where "race-tracking" of resin past regions of the semi-permeable membrane occurs, infusion towards other regions of the vacuum apparatus can still progress. Elongate vacuum port components or vacuum components, or those with elongate internal cavities extending to said holes or channels in the contact surface, may be particularly prone to vacuum lock-off. Thus, the use of semi-permeable membranes may be of particular utility in regard to such embodiments.

The invention accordingly extends in a second aspect to a vacuum apparatus comprising a vacuum port component, having a body portion defining a contact surface, which is optionally planar, and wherein the apparatus comprises a vacuum port oriented away from the contact surface;
  wherein the body portion defines at least one internal cavity (or channel) in fluid communication with the vacuum port; and
  wherein the contact surface defines a plurality of inlet apertures or one or more inlet slots extending therethrough and in communication with the internal cavity, and wherein the vacuum apparatus comprises a semi-permeable membrane applied to the contact surface.

The footprint of the contact surface of the vacuum apparatus may be substantially larger than the flow area of a conventional vacuum nozzle. For example, whereas the flow area of a conventional vacuum nozzle is conventionally around the same as, or the same order of magnitude as, the flow area of a vacuum line and the vacuum port extending from the nozzle, the footprint of the contact surface may be at least one or two orders of magnitude greater, to thereby reduce the number of vacuum ports required. The vacuum apparatus may comprise connection arrangement(s), and may be modular, as disclosed herein. The body portion may be elongate.

The internal cavity of the vacuum port component and/or the vacuum component of any aspect vacuum apparatus disclosed herein may be a channel, or may comprise more than one channel in fluid communication with one another.

In some embodiments, each slot or aperture extends to a common internal cavity within the respective body. However, a said body portion may comprise more than one internal cavity, each internal cavity being in fluid communication with the vacuum port, when the vacuum port component and vacuum component are connected to one another.

For example, in some embodiments, a said contact surface may comprise more than one slot (e.g. parallel, along its length), each slot extending to a corresponding internal cavity, the internal cavities being in fluid communication with one another or to the vacuum port.

The vacuum port component of vacuum apparatus disclosed herein may comprise a vacuum port which is integral to the body portion. Typically, the vacuum port extends from the vacuum port component body portion in the opposite direction to the contact surface, such that in use the vacuum port, or a vacuum line connected thereto, may extend through an aperture in a vacuum bag. In some embodiments the vacuum port extends at another angle in relation to the contact surface, for example orthogonal thereto.

The vacuum port may comprise a connector, for connection to a vacuum line. Any suitable connector may be used, such as a connector associated with a stem portion (e.g. a barbed connector, i.e. a neck with external ridges), or a tri-clover fitting or the like.

The vacuum port may comprise a sealing arrangement. A sealing arrangement may include a first flange portion, oriented away from the contact surface (and thus towards a vacuum bag in use) and a second flange portion, such the bag-facing end of a collar threaded or otherwise coupled to the neck of a vacuum port, in use.

The vacuum port may comprise a threaded connection, for receiving a threaded nut or collar, to compress the first flange portion against the inside of vacuum bag, and a corresponding flange portion (of the collar) or a washer, against the outside of the vacuum bag.

In use a seal may be provided by compression between the vacuum bag material and one or both flange portions, optionally facilitated at least in part by O-rings or the like.

Co-pending UK application no. GB1815871.7, the contents of which are incorporated herein by reference, discloses suitable connectors. GB1815871.7 discloses a connector body having a stem for connection at a first end to a conduit, and a flange surface around a second end of the stem for sealing against a first side of a said. The body has a lumen therethrough, the lumen extending through the first and second ends of the stem. A collar has a bore sized to receive the stem, and one end of the collar has a flange surface around the bore for sealing against a second side of a said barrier. The stem and collar of such connectors may be threaded. The stem and collar can be configured to together define a retention mechanism when the collar is placed over the stem, to resist movement of the collar towards the first end of the stem. The retention mechanism may be a ratchet type arrangement, or a thread with one or more "stop" positions defined therein.

The vacuum port may be connected to the vacuum port component body portion, or may be co-moulded or otherwise of unitary construction therewith.

Reference herein refer to an inlet slot (curved or straight) extending along or around the contact surface refer to an opening having a length much greater than the width across the slot, for example at least 10 times or 100 times. An inlet "aperture" by contrast has a lower aspect ratio, typically much lower such as below one to five, or one to three.

In embodiments in which the contact surface of the (or each) said component comprises inlet apertures, the apertures may be any suitable shape, but are conveniently circular. Other shapes may include oval, rounded rectangular, discorectangular, polygonal or the like.

The plurality of apertures may be evenly distributed across the contact surface of the vacuum component (and optionally, the vacuum port component).

Alternatively, the aperture may have a number density that varies the contact surface. Such variation of the number density may provide for a degree of tuning of the rate of flow of matrix material into the vacuum apparatus, in effect to modify the shape of the flow front and facilitate even infusion.

For example, in embodiments having an elongate body portion of one or both of the vacuum port component and the vacuum component, the number density of apertures may be greater at one end of the contact surface than at the other and may taper therebetween.

As known in the art, the thickness and/or geometry of the reinforcement lay-up may give rise to variations in the permeability to the matrix material, and variation in the number density of the apertures may be selected to compensate for matrix material reaching one part of the contact surface earlier than another part of the contact surface.

The vacuum apparatus may comprise other flow adjustment means, such as inserts for insertion into the internal cavity of a said body portion or connector sub-arrangement(s) thereof. A flow adjusting insert may for example include a reduced flow area therethrough (in comparison to the connector sub-arrangement). A flow adjusting insert may for example comprise a fabric material (woven or non-woven) such as a braid or wad of fabric material which may be inserted into a said internal cavity.

An insert may be inserted into a connection sub-arrangement, to regulate flow of matrix material downstream thereof. During evacuation of the vacuum apparatus, the use of insert(s) in this way may enable flow to be at least partly restricted though selected body portions of modular vacuum apparatus, as disclosed herein.

In some embodiments, wherein a said internal cavity may be accessed via a slot in a contact surface, an insert may be introduced into said internal cavity via the slot; for example wherein the corresponding body portion is sufficiently resilient and deformable.

A contact surface of any part of the apparatus (connecting piece, vacuum component, vacuum port component, end plug etc., as discussed below) which in use is placed against a surface of the reinforcement lay-up (either directly or via an additional material layer) may be provided with a key formation, to assist in maintaining the position of the apparatus or component thereof.

A key formation may comprise one or more (typically protruding) formations such as such as a ridge, dot, V-formation or the like. Such formations are typically rounded.

Key formations may be of particular assistance in maintaining the position of a body portion along a ridge or edge (e.g. a cut edge, generally through a stack of plies of a sheet reinforcement material).

An additional material layer may extend around or have an aperture therethrough to accommodate the key formations. The key formations may, accordingly, assist in positioning of an additional material later being applied to a contact surface of the vacuum apparatus.

The skilled person will appreciate that such formations are necessarily small (for example no more than 1-3 mm extension from the contact surface) to avoid leaving unacceptable imprints on a composite surface.

The vacuum apparatus may comprise multiple connection arrangements.

The vacuum port component and/or the vacuum component may comprise more than one connection sub-arrangement, for example at each end, or on two, three or more sides of the body portion thereof.

Further connection sub-arrangements may facilitate connection to further vacuum components and/or further vacuum port components, in order to assemble a more extensive vacuum apparatus extending over a larger portion of a reinforcement lay-up.

The vacuum apparatus may, accordingly, comprise more than vacuum component and/or more than one vacuum port component.

Whilst the vacuum apparatus may include more than one vacuum port component, it is to be understood that the overall number of vacuum ports would still be reduced in comparison to conventional vacuum assisted infusion set-ups. The inventors have found that number of vacuum ports required may be less than 60%, or be less than 50% or around 45% of conventional vacuum assisted infusion set-ups. In turn, the number of external connections required in the vacuum system can be reduced, by as much as 25%, 50% or 75%, thereby reducing set-up time required and potential sources of leakage.

The vacuum apparatus may comprise one or more further connecting pieces, each of which are connected or connectable to or between, vacuum components and/or vacuum port components.

The vacuum apparatus may comprise one or more two-, three-, or four-way connecting pieces, with connector sub-arrangements arrangements extending in two, three or four corresponding directions. The apparatus may include one or more of each type of connecting piece.

Each connecting piece, places the internal cavities of any two vacuum components or vacuum port components connected thereto in fluid communication with one another. A connecting piece accordingly comprises a body defining a contact surface and an internal cavity or cavities. Optionally, a connecting piece may comprise apertures or slots through the contact surface.

A connecting piece may include connection arrangements arranged orthogonally or in line with one another, so as to provide a corner connecting piece, a T-piece or a 4-way connecting piece or the like. A connecting piece may be flexible, to provide for adjustment of the angle between connection arrangements.

A vacuum port component may include more than one connector sub-arrangement, and so be adapted to function as a connecting piece.

The apparatus may comprise one or more end caps, for blocking connector sub-arrangements not in use.

The modular arrangement of the vacuum apparatus (i.e. comprising one or more of each of a vacuum component, vacuum port component, connecting piece or end cap) allows the vacuum apparatus to be constructed from standardised parts, to suit any configuration of reinforcement lay-up.

A modular vacuum apparatus may be constructed from a kit of parts.

The invention extends in a third aspect to a said kit of parts comprising:
  two or more vacuum components, each having a vacuum component body portion defining a contact surface and an internal cavity; wherein the vacuum component contact surface comprises a plurality of inlet apertures or one or more inlet slots extending therethrough and in communication with the internal cavity;
  one or more vacuum port components, each having a vacuum port component body portion defining a contact surface and an internal cavity, the vacuum port component further comprising a vacuum port oriented away from the contact surface and in communication with the vacuum port component internal cavity;
  the one or more vacuum port components being connectable to the two or more vacuum components to form a vacuum apparatus according to the first aspect.

The kit may comprise one or more two-way, three-way, and/or four-way vacuum port components, with connector sub-arrangements extending in two, three or four corresponding directions, each having channels which communicate with one another and with the vacuum port of the said vacuum port component.

The kit may comprise one or more two-way, three-way, and/or four-way connecting pieces, with connector sub-arrangements extending in two, three or four corresponding directions, each having channels which communicate with one another.

The kit may comprise one or more end caps, for blocking connector sub-arrangements not in use.

It may be convenient for each vacuum component to be provided with only a first type of connector sub-arrangement (e.g. comprising only male, or only female, connectors), and for each connection piece and end cap to comprise only a second type of connector sub-arrangement. Any connector sub-arrangement of any connecting piece or end cap may thereby be connectable to any connector sub-arrangement of any vacuum component.

The kit may comprise one or more vacuum port components having only the first type of connector sub-arrangement. The kit may comprise alternatively or in addition, one or more vacuum port components having only the second type of connector sub-arrangement.

The kit may comprise one or more flow adjusting inserts, for insertion in a said connector sub-arrangement or a said internal cavity.

The kit may comprise one or more additional material layers, such as a semi-permeable membrane, which may be applied in use to the contact surface of a vacuum component, vacuum port component etc. in use. Additional material layers may be provided in sheet form to be cut to size, or may be provided as templates.

According to a fourth aspect of the invention there is provided a method of applying a vacuum to a reinforcement lay-up in a vacuum bag; the method comprising;
  providing a reinforcement lay-up on a mould;
  providing a vacuum apparatus according to the first aspect;
  connecting the vacuum port component to the vacuum component to place the respective internal cavities in fluid communication with one another;
  placing the contact surfaces of the vacuum port component and the vacuum component against the reinforcement material;
  coupling the vacuum port of the vacuum apparatus to a vacuum system through an aperture in a vacuum bag;
  sealing the vacuum bag to the mould around the reinforcement lay-up; and
  applying a vacuum to the reinforcement lay-up using the vacuum system, via the plurality of inlet apertures, or the one or more slots.

By mould we include any platform upon which a reinforcement material may be laid-up and infused, including shaped cavities defining at least a portion of an outer surface of the intended composite article, and planar tooling surfaces or the like.

The vacuum apparatus may comprise more than one vacuum component and/or more than one vacuum port component, optionally also one or more connecting piece and/or end cap. The vacuum apparatus may be provided from a kit according to the third aspect.

The method may therefore comprise one or more steps of connecting said components, connecting piece(s) and/or end cap(s) to one another to assemble the vacuum apparatus. The method may comprise one or more steps of placing these parts on the reinforcement material and/or coupling.

The steps of the method may be conducted in a variety of sequences. For example, the vacuum apparatus may be assembled and then placed on a reinforcement lay-up, or assembled and placed in stages.

The method may comprise laying up multiple plies of a dry reinforcement material, such as a fabric or non-woven on the mould. The reinforcement material may for example be a woven or non-woven fabric, including but not limited to a carbon fibre fabric material or a glass fibre fabric material.

Such materials of this general type are well known in the art, and may comprise additional components such as binder or surface treatments applied to the material. By "dry" we therefore refer to an absence of a matrix material.

The reinforcement lay-up may be provided as a pre-form, by which we mean in a consolidated but non-impregnated form, which may for example maintain some structural integrity during transfer by virtue of interlocking fibres of reinforcement material and/or surface binder applied thereto.

The reinforcement lay-up may also be provided with reinforcing members, such as beams, core materials or the like. Hard tooling may also be provided, against or within the lay-up, for example to ensure specific dimensions to portions of a resulting composite article intended for connection to other components.

Placing of the vacuum apparatus may comprise placing the contact surface(s) against a face of the reinforcement lay-up, for example on a flat (i.e. planar) surface of an outermost ply of reinforcement fabric, or, where the contact surface is non-planar, against a correspondingly profiled surface of the reinforcement lay-up. The surface may in some embodiments include a ridge along a portion of the reinforcement lay-up.

Placing the vacuum apparatus may comprise placing the contact surface(s) against an edge of the reinforcement lay-up.

By "edge" we refer to reinforcement lay-ups formed from multiple plies of a reinforcement fabric material, each ply having opposite faces and peripheral edges therebetween, and to placement of the vacuum apparatus with the contact surface(s) against peripheral faces of multiple plies and thus an angle to their faces.

The angle is typically substantially perpendicular to the faces of the plies, but other angles are also possible.

The method may comprise trimming the reinforcement lay-up to provide "clean" edges, wherein, along the resulting edge, peripheral edges of multiple plies are co-planar.

A reinforcement lay-up may include further components such as hard tooling (to impose precise dimensional requirements on a portion or the totality of the lay-up), core materials such as foam or honeycomb cores embedded within the reinforcement lay-up (for example between plies), and/or co-infused reinforcement members such as beams, typically of composite construction. Other further components may include other material layers, such as metallic or polymeric mesh materials may be included in the reinforcement lay-up, to modify structural properties of the resulting composite articles.

The method may comprise placing the contact surface(s) across an interface between the reinforcement material and a further component.

The vacuum apparatus may include one or more key formations, and the method may comprise embedding one or more key formations in a surface or an edge of the reinforcement lay-up. A key formation may be embedded in an edge between adjacent plies.

The (or each) vacuum port may be coupled to the vacuum system via a vacuum line, typically a flexible vacuum line.

A vacuum line may be passed through an aperture in the vacuum bag and coupled to the vacuum port. The method may further comprise sealing the vacuum bag around the vacuum line, with adhesive tape, sealant or the like.

More typically the vacuum port includes a stem portion and the method comprises passing a stem portion of the vacuum port through an aperture in the vacuum bag and then coupling a vacuum line thereto.

The method may further comprise sealing the (or each) vacuum port to the vacuum bag. For example, the method may comprise placing the vacuum line through a collar or necked flange, and sealing the vacuum bag to the vacuum port using the collar (e.g. by compression).

The vacuum apparatus may have any such further features as disclosed above in relation to the first aspect.

The vacuum apparatus may be modular. The method may comprise assembling the vacuum apparatus from component parts, such as from one or more body portions (optionally elongate), end caps, vacuum ports or flow restrictors as disclosed above.

The various parts of the vacuum apparatus may be connected together by any suitable method, but conveniently the vacuum port component(s), vacuum component(s) and any end caps or connecting pieces comprise connector sub-arrangements as disclosed herein, adapted to be pushed or clipped together to establish such connections.

The invention also extends in a fifth aspect to a method of making a composite article, comprising applying a vacuum to a reinforcement lay-up in a vacuum bag in accordance with the fourth aspect, and infusing the reinforcement lay-up with a matrix material. The matrix material may be infused from a matrix material source (e.g. a resin pot) via an inlet (or multiple inlets) to the vacuum bag.

The method may comprise applying a vacuum via the vacuum apparatus, during infusion.

The method may be a VARTM method of composite manufacture.

The method may comprise applying a vacuum after infusion.

Application of a vacuum during and/or after infusion of matrix material may result in excess matrix material flowing into the vacuum apparatus.

Accordingly, the method may comprise removing excess matrix material from the reinforcement lay-up, using the vacuum apparatus.

Alternatively, the method may comprise preventing resin from entering at least a part of the vacuum apparatus, using semi-permeable membrane material applied to one or more said contact surfaces.

The method may comprise applying one or more additional material layers to a contact surface of the vacuum apparatus. Additional material layers may be applied to each contact surface, or to each contact surface comprising inlet apertures or inlet slots.

The method may comprise cutting the one or more additional material layers to size.

The one or more additional material layers may comprise a semi-permeable membrane.

Such selective application of a vacuum may be provided by providing a higher number density of apertures through a first part of a said contact surface than through a second part of the contact surface.

In embodiments wherein the vacuum apparatus comprises more than one vacuum component or vacuum port component coupled together, a higher number density of apertures may be provided in the contact surface of a first said component than of a second said component, to selectively modify flow into the internal cavity.

The method may alternatively, or in addition, comprise restricting the flow area through an internal cavity of a said component. The flow area may be restricted by inserting a flow restricting insert into a said internal cavity, or into a connection sub-arrangement.

The method of making a composite article may further comprise setting or curing the matrix material.

A matrix material, such as a thermoplastic matrix material, may be caused to set by cooling. In some embodiments, a matrix material is heated prior to and during infusion and then the source of heating discontinued.

A matrix material such as a curable plastics material (e.g. a curable resin such as an epoxy resin) may cure over time at ambient conditions. The method may further comprise heating the infused reinforcement lay-up to promote curing.

The method may comprise such further steps as are common in composite manufacture, such including removal of the vacuum bag and associated apparatus, surface finishing and the like.

Reference herein to components, parts, channels, apertures, connection arrangements etc. of the vacuum apparatus being in fluid communication with one another, we refer to the presence of a flow pathway within the vacuum apparatus extending between the said components, parts, channels, apertures, connection arrangements etc. within the vacuum apparatus.

Further features of each aspect of the invention correspond to further features of each other aspect of the invention. The methods disclosed herein may include steps associated with the use of the apparatus according to the invention and as otherwise disclosed in connection therewith. Conversely, the apparatus may comprise such apparatus employed in conducting the methods, including but not limited to additional apparatus known in composite manufacturing.

DESCRIPTION OF THE DRAWINGS

Example embodiments will now be described with reference to the following drawings in which:

FIG. 12b shows a cross sectional view through the apparatus of FIG. 12a;

DETAILED DESCRIPTION OF EXAMPLE EMBODIMENTS

Figure 1:
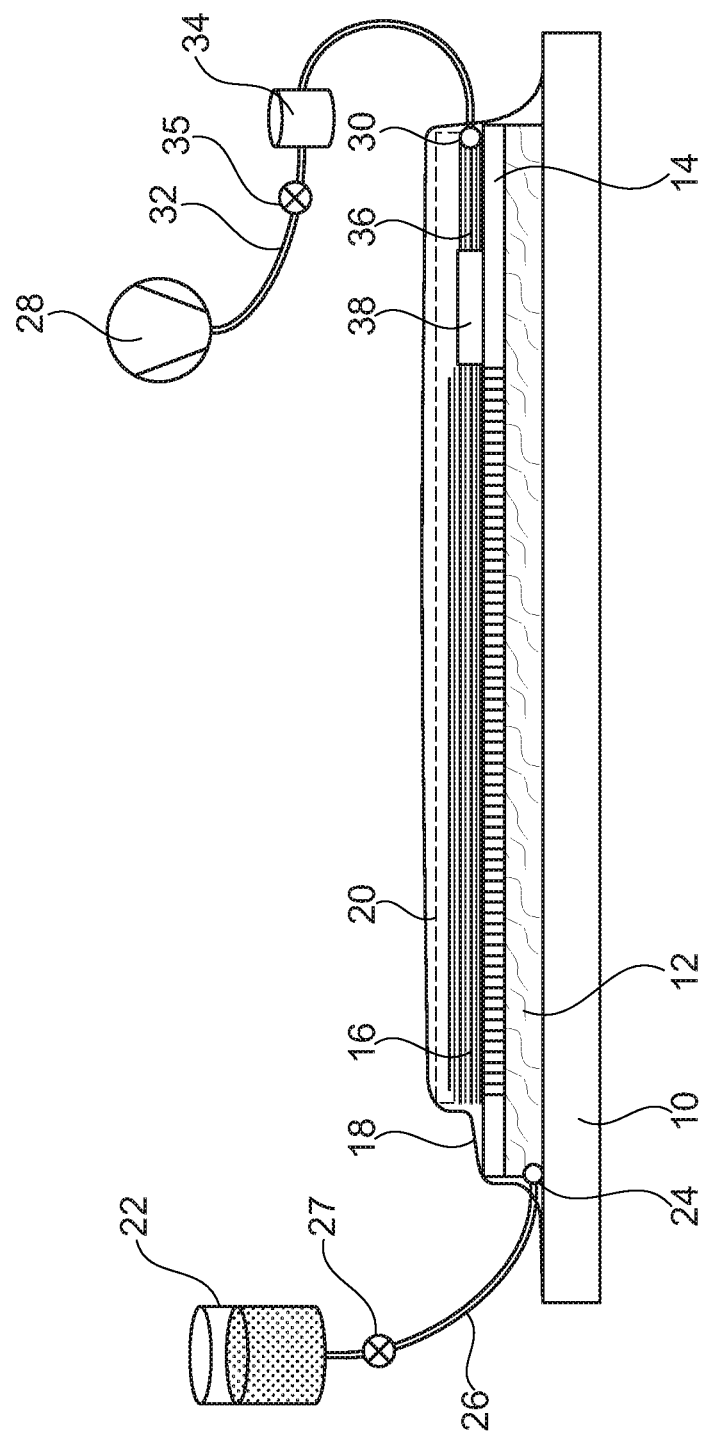
FIG. 1 is a schematic cross sectional side view of a typical resin infusion set-up, for vacuum assisted through the thickness resin transfer.
Figure 2A:
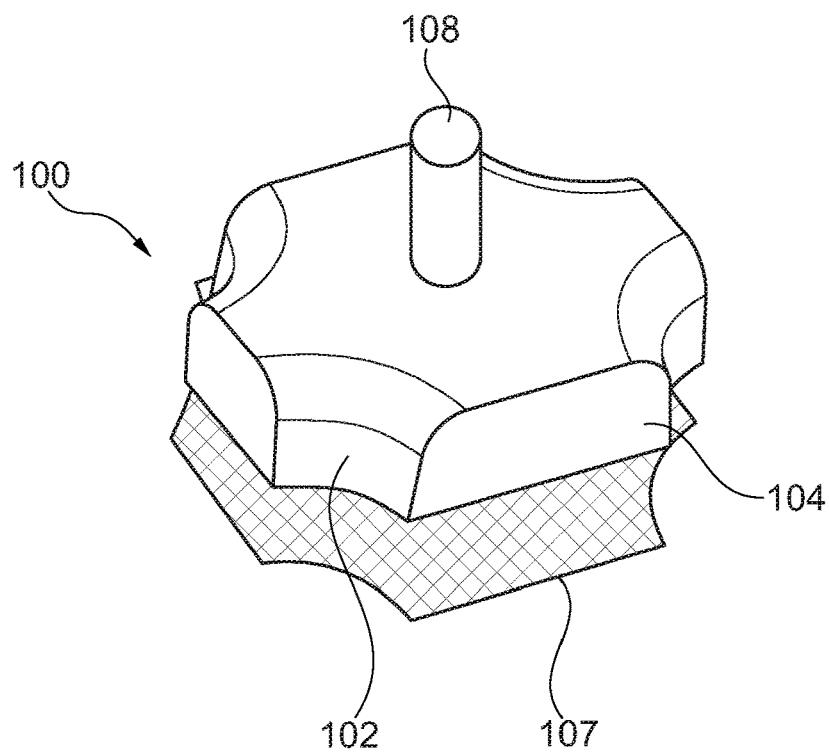
FIGS. 2a and 2b show perspective top and underside views of a vacuum apparatus.
Figure 2B:
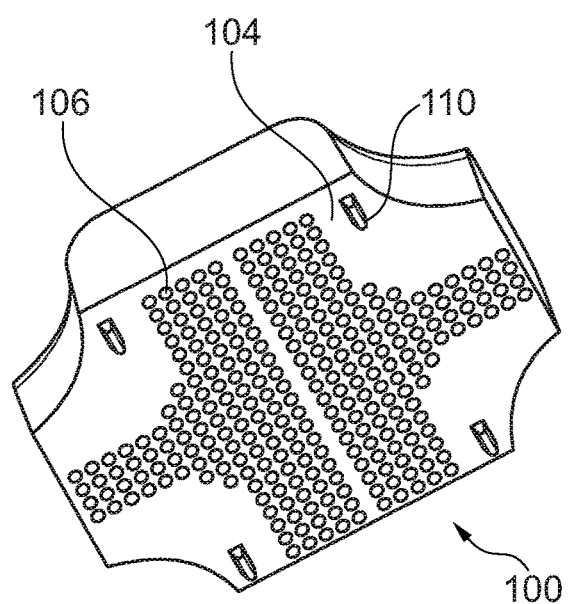

FIGS. 2a and 2b show perspective top and bottom view of a vacuum apparatus 100 for applying a vacuum to a reinforcement lay-up, such as a dry carbon fibre fabric lay-up, during VARTM.

The vacuum apparatus, a vacuum port component 100, has a body 102 with a planar contact surface 104 for placement on the surface of a reinforcement lay-up. The contact surface has a plurality of inlet apertures 106 therethrough, which extend into an internal cavity within the body (not visible in FIGS. 2a and 2b). On the opposite side of the body, oriented away from the contact surface 104, is a vacuum port 108, which is also connected to the internal cavity. In alternative embodiments (not shown) the contact surface has one or more slots across and/or around the contact surface.

The vacuum port is shown (schematically) as having a neck portion configured to extend through an aperture in a vacuum bag in use, and to connect to a vacuum line or hose. Typically, a neck with barb connections would be used but friction fittings or press fit connectors are also possible.

The surface area of the contact surface 104 over which the apertures 106 are distributed is considerably larger than the footprint of a conventional nozzle of a vacuum connector (in the example shown the length and width being around five times as wide as a vacuum nozzle normally used with a vacuum port of similar size to port 108). This provides for more effective application of a vacuum to (and in some circumstances removal of excess resin from) a reinforcement lay-up. Not only is the vacuum pressure more broadly distributed, but in embodiments the contact surface 104 may extend over an area which might otherwise require the provision of more than one vacuum port.

Extending from the contact surface 104 are key formations 110

A semi-permeable membrane 107 is affixed to the contact surface 104. The semi-permeable membrane 107 and body portion 104 are shown in an "exploded view" in FIG. 2a, and the membrane is omitted from FIG. 2b for clarity. The membrane 107 is substantially the same size and configuration as the contact surface and so extends across the apertures 106. In use, the semi-permeable membrane allows passage of gas, for example during evacuation of a vacuum bag and/or gas displaced or evolved during infusion, but substantially prevents passage of matrix material. Thus, the semi-permeable membrane prevents ingress of the matrix material into the internal cavity.

A semi-permeable membrane may be applied to any contact surface disclosed herein having apertures or slots therein, for this purpose.

Figure 2C:
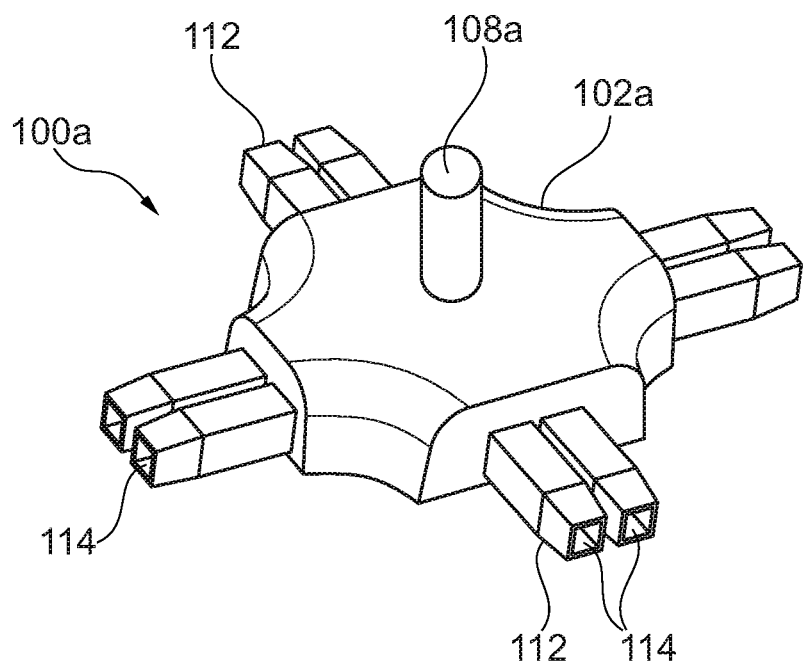
FIGS. 2c and 2d show perspective top and underside views of a vacuum port component of another vacuum apparatus, having connection sub-arrangements.
Figure 2D:
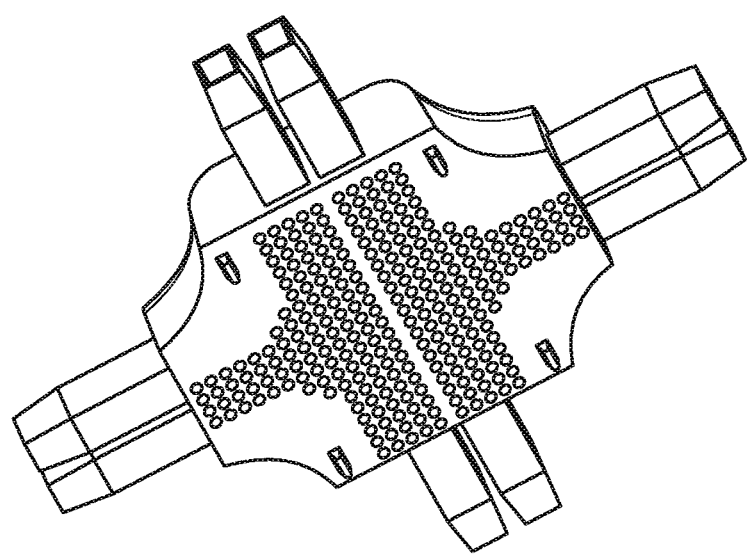

FIGS. 2c and 2d show a vacuum port component 100a which includes connector sub-arrangements in the form of connectors 112 for connection to further components to effectively extend the size of the contact surface presented by the vacuum apparatus, as described in further detail below. The connectors 112 are male connectors for insertion into corresponding female connectors. The male connectors 112 include channels 114 therethrough, which communicate with the internal cavity within the body portion 102a.

In the embodiment shown, two male connectors are shown extending in each direction from the body 102a. In alternative embodiments, female connectors (recesses or plugs) may be provided, or a connection arrangement comprising a single connector on each side may be used. Locating pins may also be provided as part the connector sub-arrangement, to assist in alignment of connected components.

The vacuum port component 100a is adapted for connection to one or more further vacuum components and part of vacuum apparatus (examples as described below) and to provide a common vacuum port 108a.

Figure 2E:
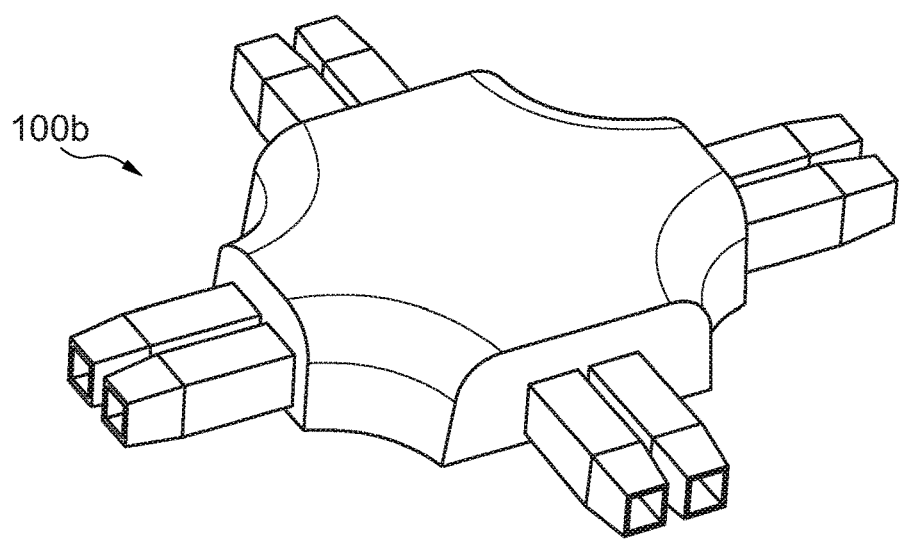
FIG. 2e shows a four-way connecting piece of the vacuum apparatus.

FIG. 2e shows a connecting piece 100b of the vacuum apparatus, which is analogous to the vacuum port component 100a, but lacks a vacuum port. The connecting piece 2e may be used to connect between vacuum components in a region of vacuum apparatus which does not require a port—thereby obviating the need for corresponding connection to a vacuum system.

The connecting piece 100b (FIG. 2e) is a 4-way connecting piece. Other arrangements such as 2-way (corner or straight), and 3-way (T-piece, triangular) and the like are also possible.

Figure 3A:
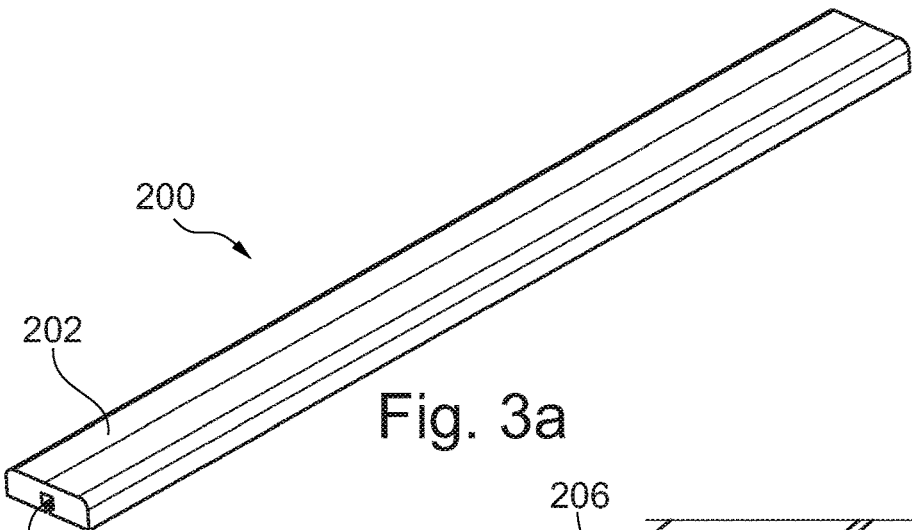
FIGS. 3a and 3b show perspective views of an elongate vacuum component of the vacuum apparatus.
Figure 3B:
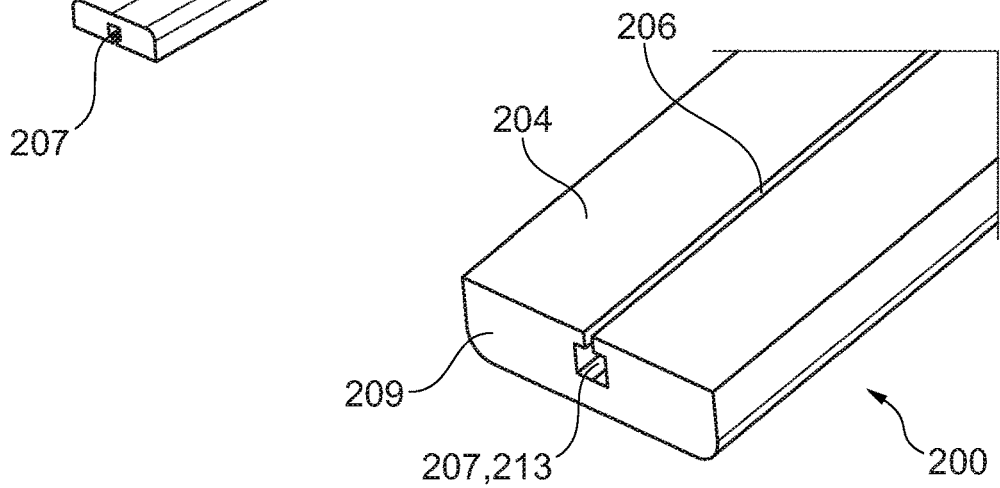

FIG. 3a shows a vacuum component 200 with an elongate body portion. The contact surface 204 (FIG. 3b) has an elongated slot 206 therethrough. The slot extends to an internal cavity 207 (also elongate, in this embodiment) extending along and within the body 202. The vacuum component (and indeed other parts of the vacuum apparatus) can be of a flexible material such as silicon rubber or similar so as to conform to the geometry of the reinforcement lay-up.

The portion of the cavity 207 at the end 209 of the body is adapted to receive a male connector (not shown) and is thus configured in this region to function as a female connector 213.

Figure 4A:
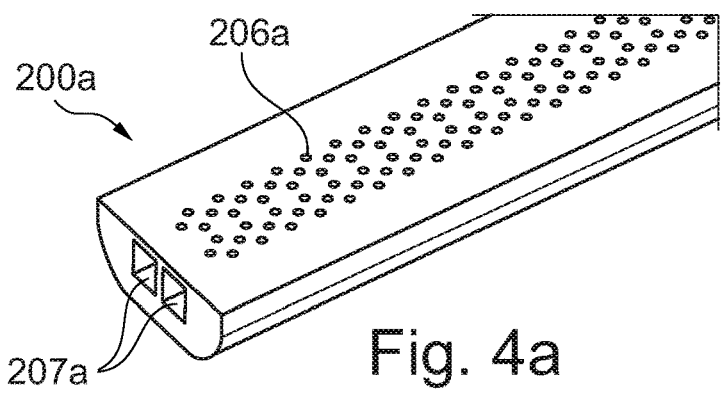
FIGS. 4a and 4b show perspective close up views of alternative elongate vacuum component, viewed showing the contact surfaces upward.
Figure 4B:
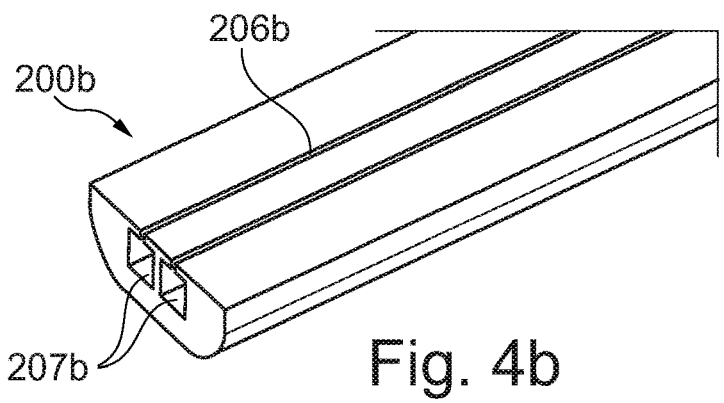

FIGS. 4a and 4b show views of the underside of alternative embodiments of elongate vacuum component 200a and 200b. The bodies of the vacuum components 200a and 200b each have two internal cavities 207a, 207b. These vacuum components 200a, 200b are thus configured to be coupled to a vacuum port component such as the vacuum port component 100a or the connecting piece 100b, shown in FIGS. 2c, 2d and 2e.

The vacuum apparatus 200a has a contact surface 204a has a plurality of apertures 206a therethrough, which communicate with the internal cavities 207a. The vacuum component 200b has an elongate slot 206b communicating with each respective elongate cavity 207b.

Elongate vacuum component body portions as disclosed herein may conveniently made by extrusion of a plastics material. In addition, in use they may be readily cut to a required length.

As discussed above the vacuum apparatus disclosed herein may be of modular construction, for example from a kit of standard components, such as those described with reference to FIGS. 5-7.

Figure 5:
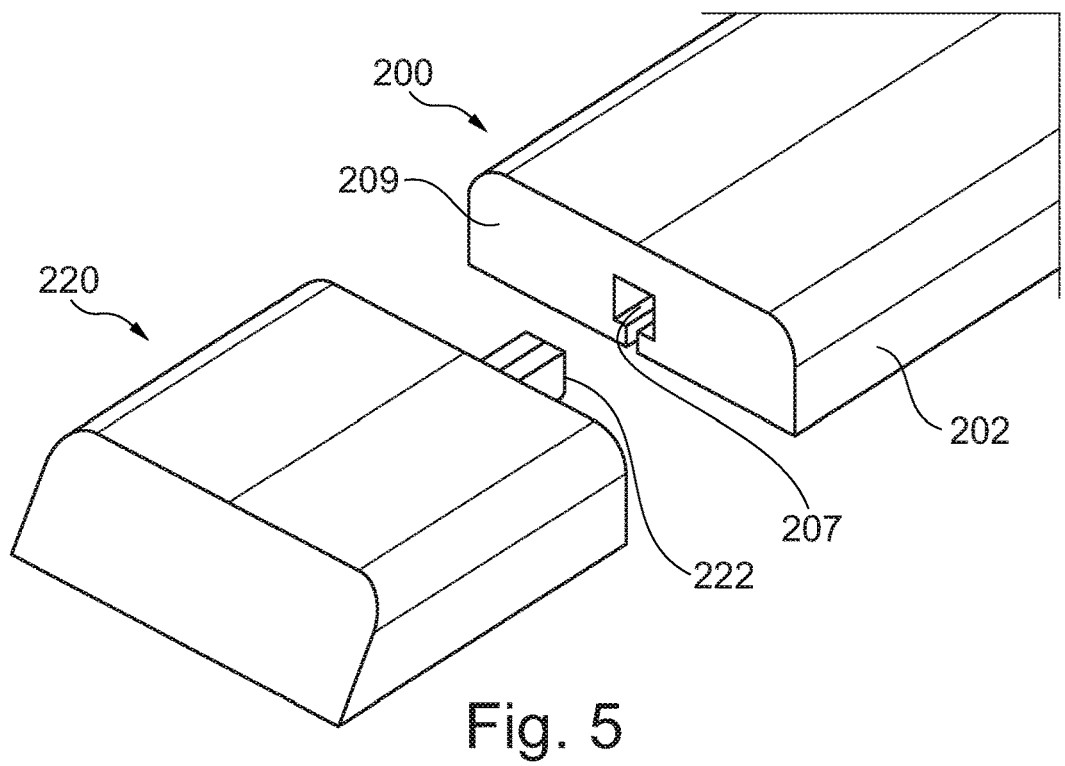
FIG. 5 shows a perspective view of an end cap of the vacuum apparatus.

FIG. 5 shows an end cap 220. The end cap has a "blank" male connector 222 to plug in and couple to the end of the cavity 207 at the end 209 of the vacuum component body 202. The connector 222 lacks a central channel and so acts as a terminating piece for such modular vacuum apparatus.

Figure 6:
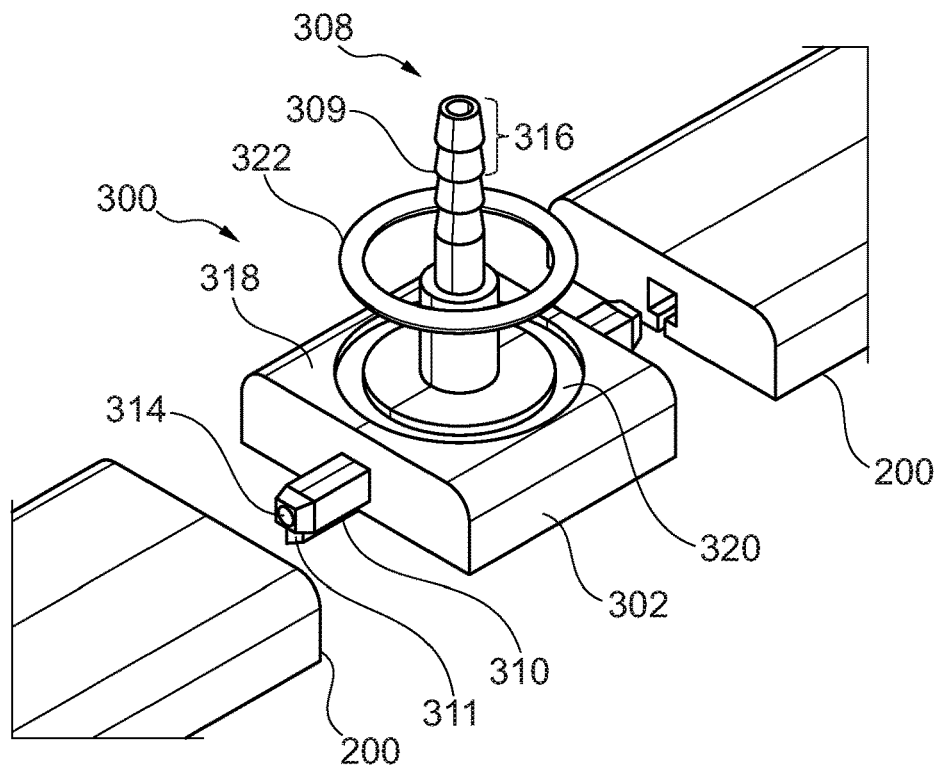
FIG. 6 shows a perspective view of a linear vacuum port component of the vacuum apparatus.

FIG. 6 shows a "straight line" linear vacuum port component 300 having a body portion 302, and male connectors 310 on opposite sides of the body 302, each having channels 314 therethrough, communicating with each other and a central cavity (not visible). The body 302 also includes a vacuum port 308 oriented away from the contact surface, having a neck 309 with a barbed hose connector 316. The top of the body 318 in use functions as a flange has an annular channel 320 therein, extending around the neck 309, which receives an O-ring 322, for sealing against an inside of a vacuum bag in use, in a manner well known in the art.

The vacuum port component 300 is configured to be coupled to the ends of elongate vacuum components 202.

Figure 7:
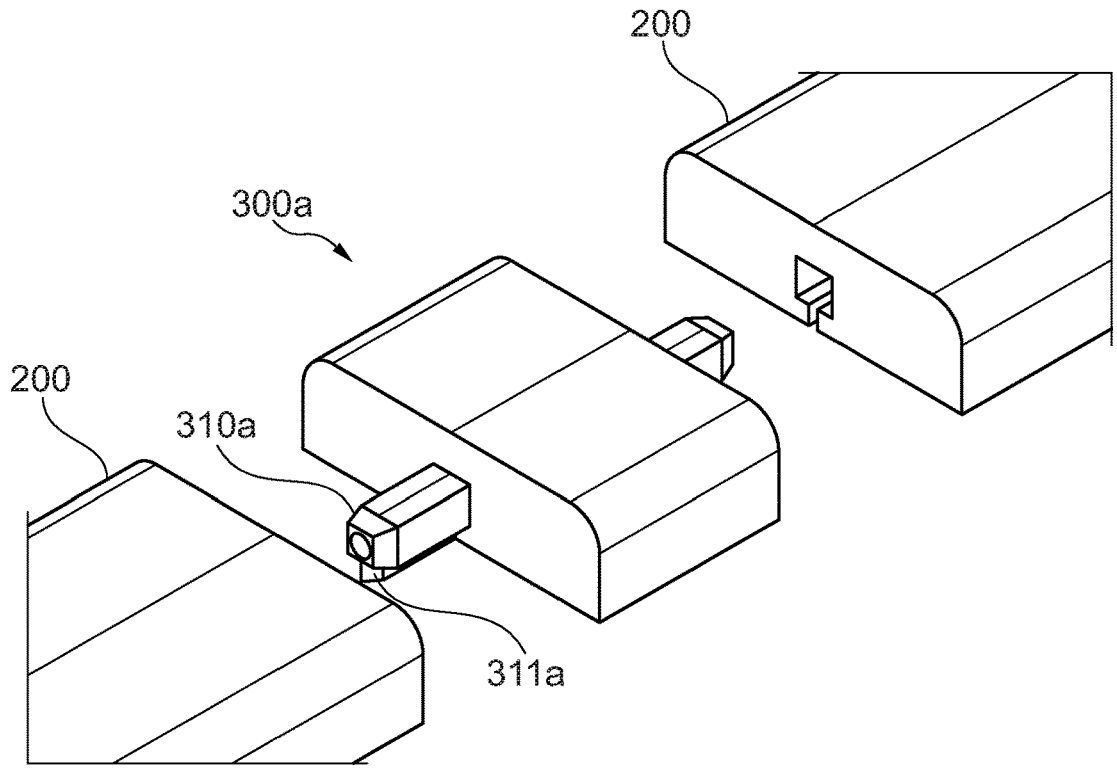
FIG. 7 shows a perspective view of a linear connecting piece of the vacuum apparatus.

FIG. 7 shows a linear connecting piece 300a, which is analogous to the vacuum port component 300, but lacks a vacuum port.

It should be noted that in the embodiment shown, the component 300 and connecting piece 300a each have male connectors 310, 310a having slot plugs 311, 311a on their undersides for blocking the ends of the slots 206. Accordingly, the contact surfaces of these connectors 300, 300a are not provided with slots or inlet apertures. Such slots or apertures may optionally be present in alternative embodiments.

Figure 8:
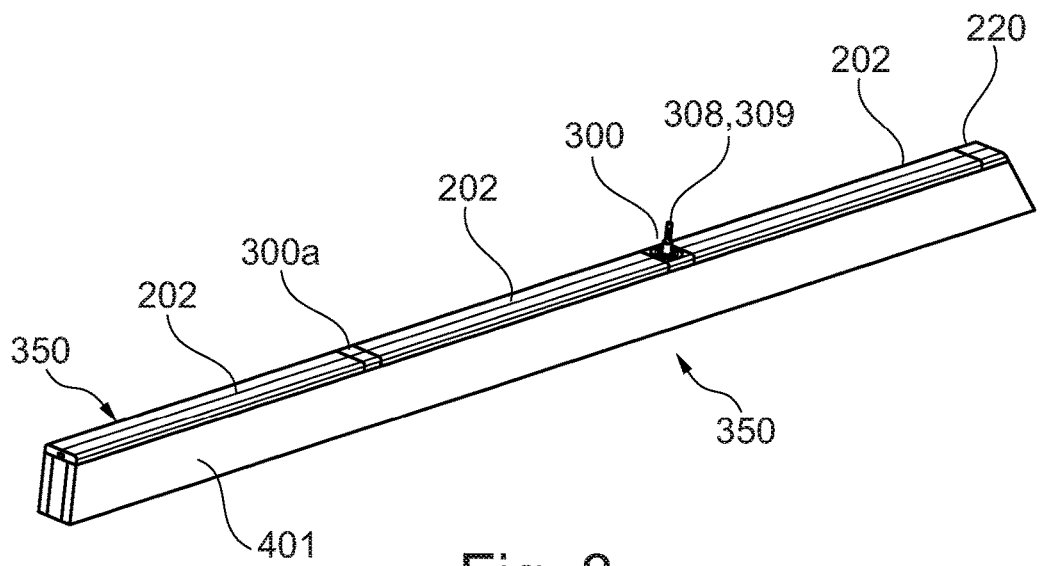
FIG. 8 shows a perspective view of a portion of a reinforcement lay-up and a vacuum apparatus against the reinforcement lay-up.

FIG. 8 shows a portion of an assembled modular vacuum apparatus 350, with a contiguous contact surface, formed from co-planar contact surfaces of its component parts against a reinforcement lay-up 401 (in the embodiment shown, running along the top of an elongate stringer mandrel, with a reinforcing web component embedded in the reinforcement lay-up). The apparatus 350 includes multiple elongate vacuum components 202, an end cap 220, a linear connecting piece 300a, and a linear vacuum port component 300.

By connecting the neck 309 of the port 308 to a vacuum system, via a vacuum line (not shown) within a vacuum bag, a vacuum may be applied to the lay-up 401 along the entire length of the stringer via a single vacuum port 308. The apparatus 350 replaces at least two further vacuum ports which would be required in a conventional VATRM setup and in addition more evenly and effectively applies the vacuum, preventing dryness in the areas between conventional extraction points that would have either wise be induced by areas of low pressure a phenomenon commonly referred to as "vacuum lock-off". The risk of vacuum lock-of can be further reduced by the provision of semi-permeable membrane along the contact surface(s) as disclosed herein.

With reference to FIGS. 9 to 12 further components of a kit for assembling modular vacuum apparatus compatible with the 4-way connecting piece 100b and 4-way connecting vacuum port component 100a, and the corresponding elongate vacuum components 200a and 200b, described above with reference to FIGS. 2c-2e and 4a and 4b.

Figure 9:
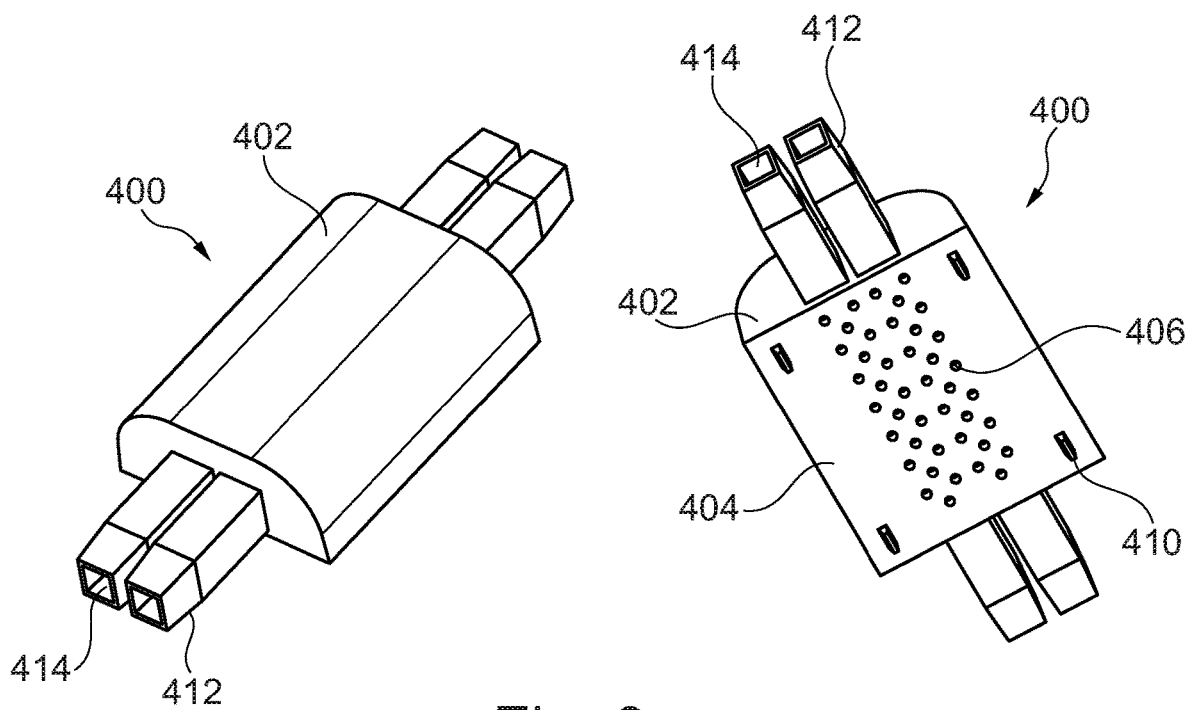
FIG. 9 shows perspective top and underside views of an alternative linear connector.

FIG. 9 shows perspective top and underside views of a linear connecting piece 400. The connecting piece has a body 402 with an array of inlet apertures 406 on a contact surface 404 thereof. The connecting piece 400 has a pair of male connectors 412 at each end, having channels 414 through to an internal cavity in the body 402, which can be plugged into the "female" ends of the channels 207a or 207b. The contact surface 404 also has key formations 410.

Whilst the connecting piece shown could also be considered to constitute a "vacuum component", its principal function is to connect adjacent larger vacuum components and so in the context of the vacuum apparatus with which it is compatible, can be regarded as a connecting piece.

Figure 10:
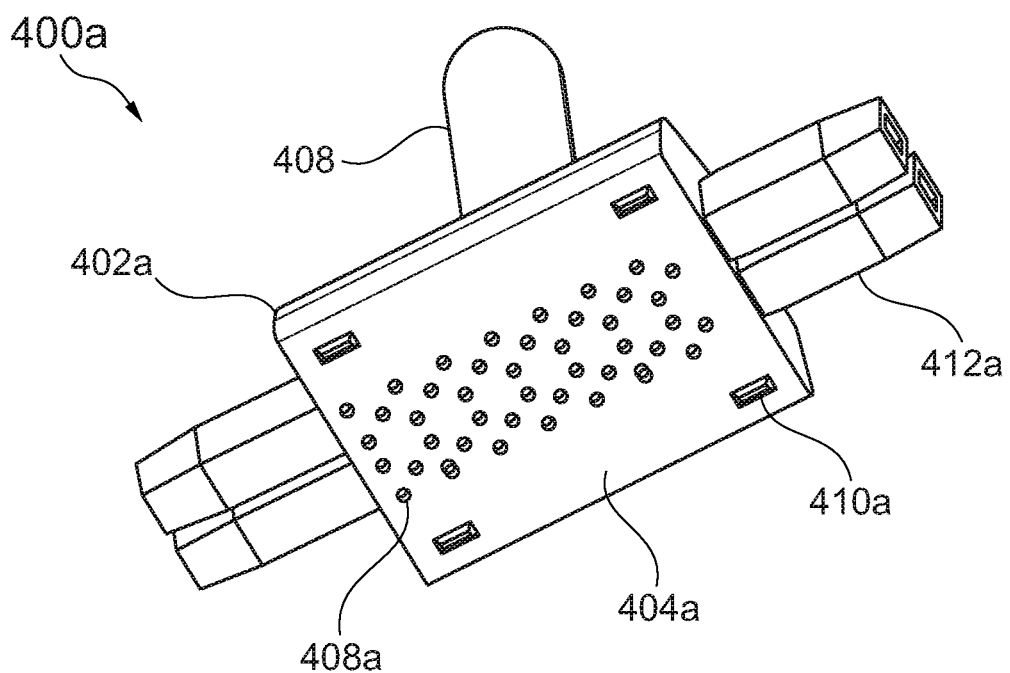
FIG. 10 shows a perspective underside view of alternative linear vacuum port component.

FIG. 10 shows a corresponding linear vacuum port component 400a, where features in common with those of the connecting piece 400 are provided with like reference numerals having a suffix "a". The vacuum port component 400a further comprises a vacuum port 408a communicating with the internal cavity thereof.

Figure 11:
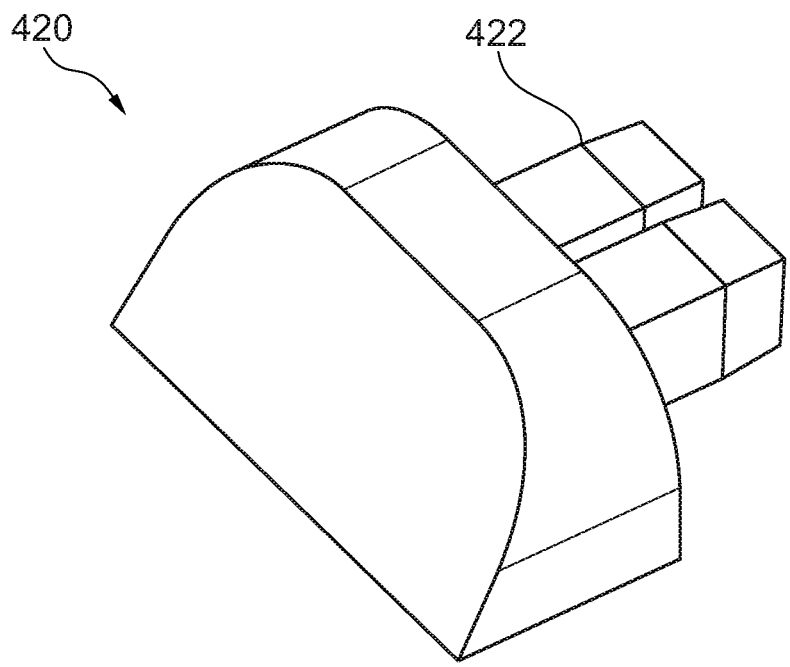
FIG. 11 shows a perspective view of an alternative end cap.

FIG. 11 shows an end cap 420, with male connectors 422.

Figure 12A:
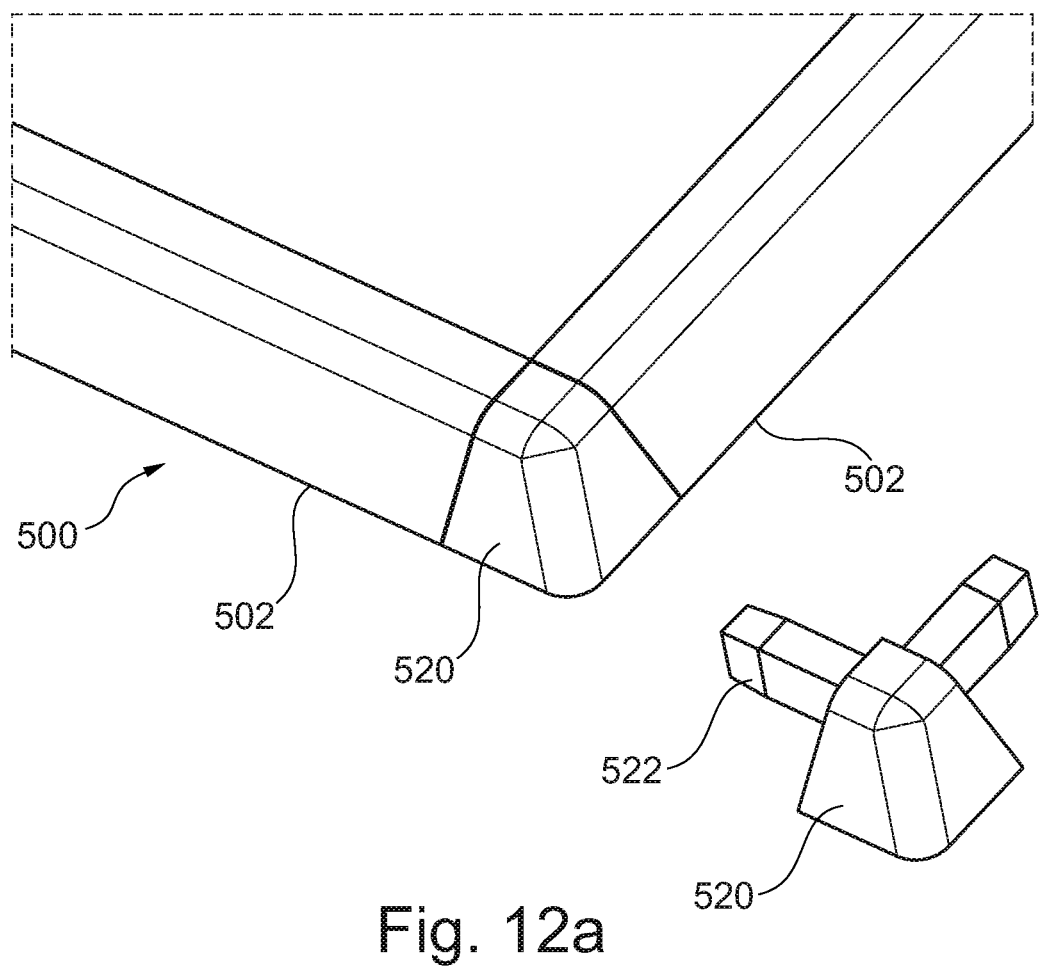
FIGS. 12a and 12c shows portions of a further vacuum apparatus against an edge of a reinforcement lay-up.
Figure 12B:
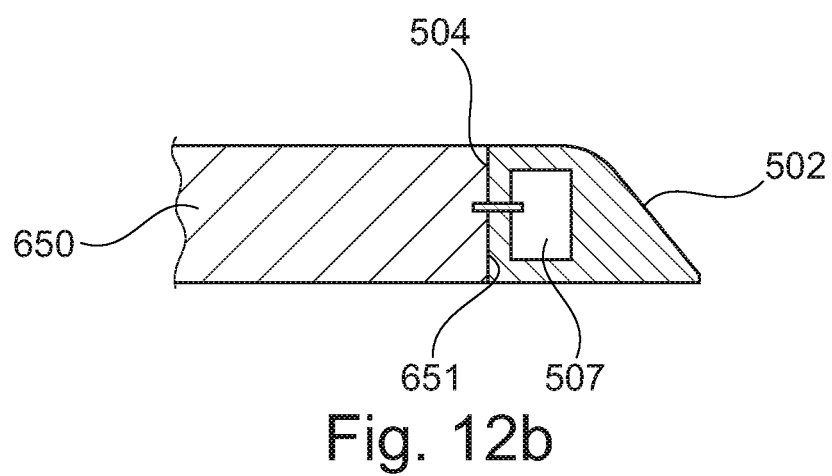

FIG. 12a shows a portion of a vacuum apparatus 500 with elongate vacuum component body portions 502, adapted to be placed against a clean edge of a reinforcement lay-up. As shown in the cross section of FIG. 12b, the vacuum components 502 have an internal cavity 507, and a contact surface 504 for placement against a clean edge 651 of a reinforcement lay up 650, perpendicular to the orientation of the plies. The edge 651 may need to be trimmed, in use. The edge 604 could be interfaced with a common permeable or semi-permeable additional material layer, as disclosed herein, for preventing ingress of resin, or providing a suitable surface finish and/or facilitating removal of the apparatus 500 after infusion.

The vacuum apparatus 500 includes corner connecting pieces 520, having male connectors 522 extending in this embodiment at right angles to one another (FIG. 12b), which can be coupled to corresponding elongate vacuum components 502. Corresponding linear connecting pieces are also contemplated.

Figure 12C:
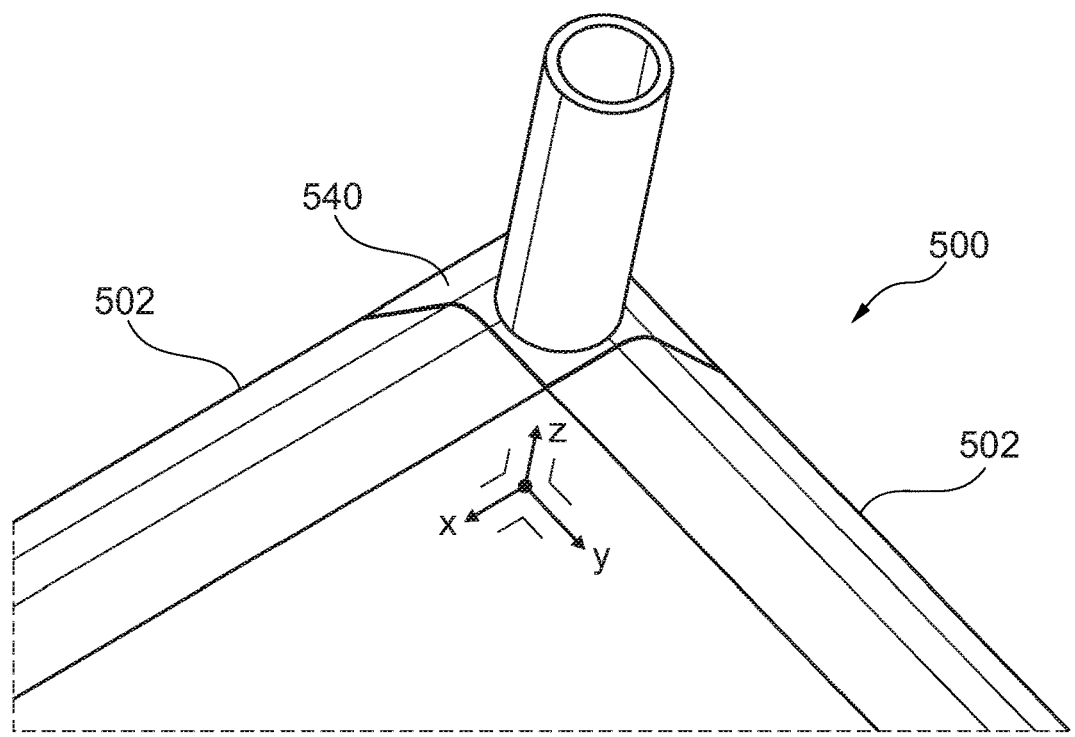
Figure 12D:
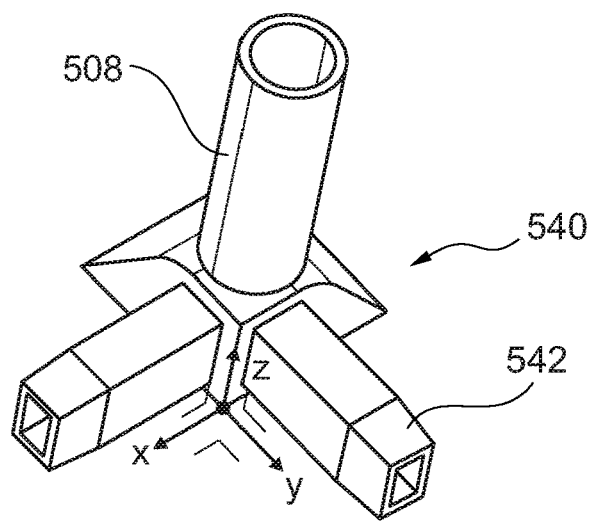
FIG. 12d shows a corner (two way) vacuum port component of the vacuum apparatus of FIGS. 12a-12c.

FIG. 12c shows another portion of the vacuum apparatus 500, with a corner vacuum port component 540 shown connected to further vacuum components 502. The vacuum port component has a vacuum port 508 and orthogonal male connectors 542 (FIG. 12d). When the vacuum port component 540 connected to a body 502, the vacuum port 508 is oriented away from the contact surfaces 504, in this instance orthogonal thereto.

Figure 13A:
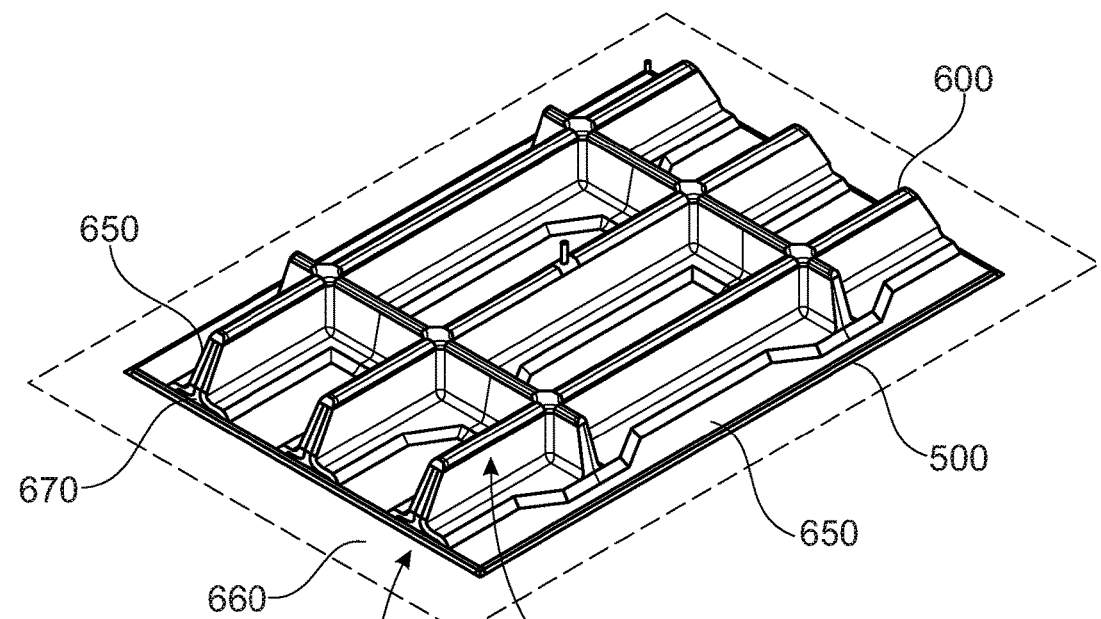
FIGS. 13a and 13b show, respectively, a vacuum apparatus and the vacuum apparatus placed against a reinforcement lay-up.

A complex reinforcement lay-up 650 is shown in FIG. 13a, which has been laid up on a tooling surface 660 over a series of metal stringer mandrels 670.

Ordinarily the reinforcement lay-up 650 would require at least two vacuum ports per stringer (i.e. 6 in total, in the example shown), each of which would require sealing against and though apertures in, a vacuum bag. Each vacuum port would also need to be connected to a vacuum system, which would necessarily therefore include a complex network of vacuum hoses extending to a vacuum pump.

Figure 13B:
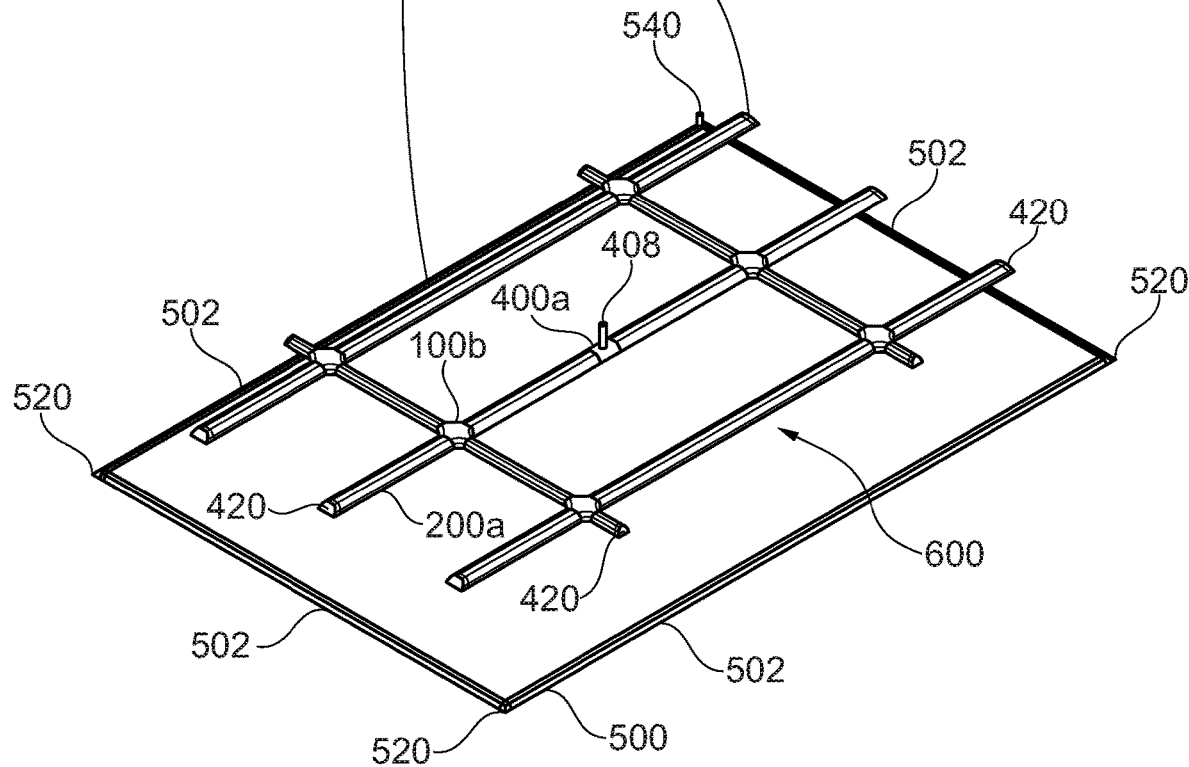

FIG. 13b shows an assembled modular vacuum apparatus 500 for placement against the reinforcement lay-up 650 around its peripheral edges, and an assembled modular vacuum apparatus 600 for placement on the upper surfaces of the mandrels—as depicted in FIG. 13a. The apparatus 500 includes four elongate vacuum components 502, three corner connecting pieces 520 and a vacuum port component 540. The apparatus 600 includes thirteen lengths of the extruded vacuum components 200a, cut to appropriate lengths, interlinked by 4-way connecting pieces 100b. The terminal ends of the components 200a are capped by end caps 420. Centrally positioned in the apparatus 600 is a linear vacuum port component 400a.

It will be appreciated that the apparatus is likely in practice to be assembled in situ, with individual components, or groups of components being placed against the lay-up 650, before draping or positioning a vacuum bag (not shown) over the reinforcement lay-up and apparatuses 500, 600, with the vacuum ports 408, 508 extending through apertures in the bag, and sealed. Thus, the number of required vacuum port connections and vacuum lines is reduced from ten or more (including those required around the periphery), as in conventional vacuum bag setup, to just two vacuum ports.

Other configurations of vacuum apparatus are also possible. For example, the linear vacuum port component could be removed and a single, longer elongate body employed, with a 4-way vacuum port component 100b in place of a 4-way connecting piece 100a.

Modular apparatus such as vacuum apparatus 600, or indeed any vacuum apparatus described herein, may also be placed on generally contact surfaces of reinforcement lay-ups, such as for aircraft skins, and not only on ridges or edges as shown in FIG. 13.

Relatively complex vacuum apparatus, such as apparatus 600, which include a network of interconnected internal cavities, and having inlet slots or apertures extending over a relatively wide area of a reinforcement lay-up may benefit from some means for selectively adjusting flow through the inlet apertures and channels in some region(s) of the vacuum apparatus. Adjustment of flow may assist achieving complete infusion of all parts of the reinforcement material. Modifying the flow in this manner can be particularly beneficial for complex lay-ups such as shown in FIG. 13a and can reduce the amount of excess resin which needs to be extracted via the vacuum apparatus and ensure complete infusion of the reinforcement material by avoiding vacuum lock off phenomena.

Figure 14:
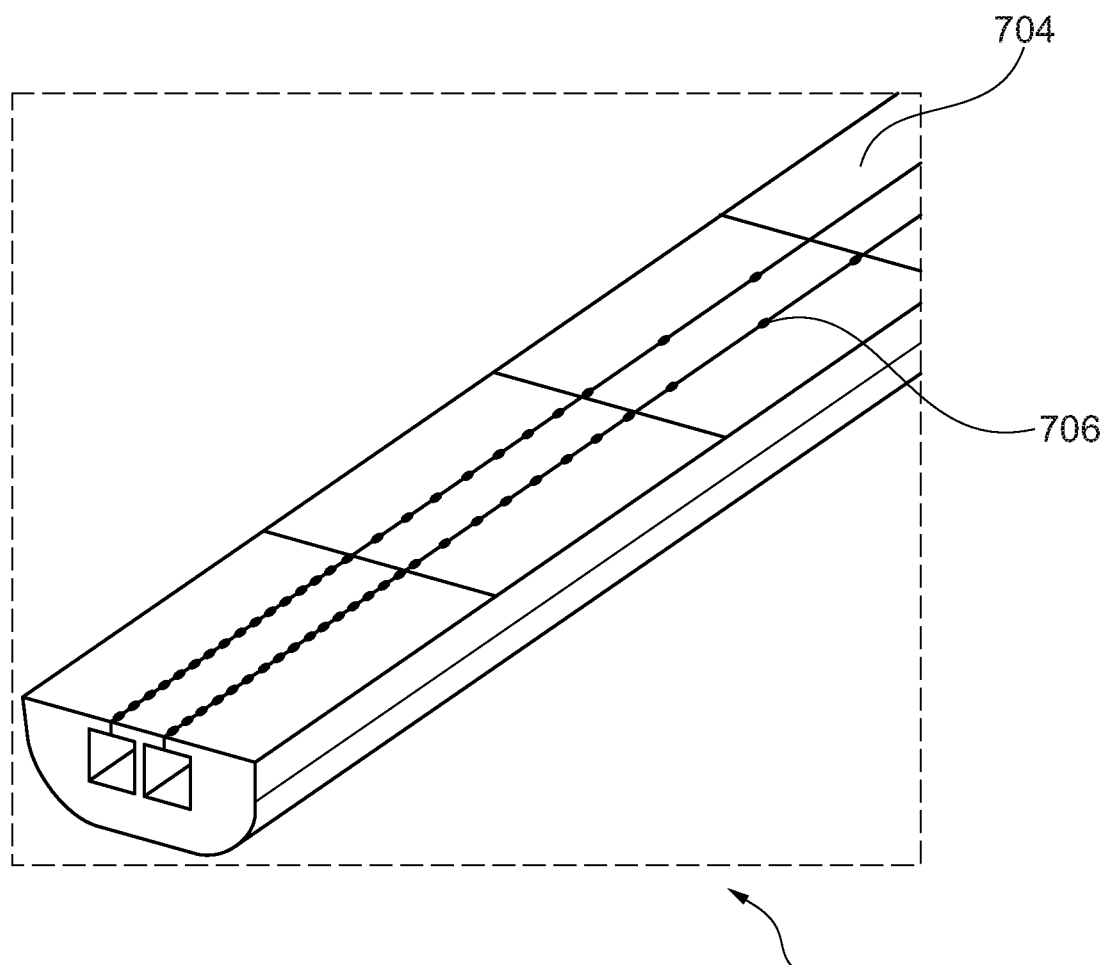
FIG. 14 shows the contact surface of a vacuum component of vacuum apparatus, configured to selectively apply a vacuum.

Flow adjustment means may take the form of a variation of the number density of inlet apertures 706, as shown in FIG. 14. The number density of apertures could for example be tapered from a high density at one end or region of a contact surface 704, to a lower number density in another region.

Figure 15:
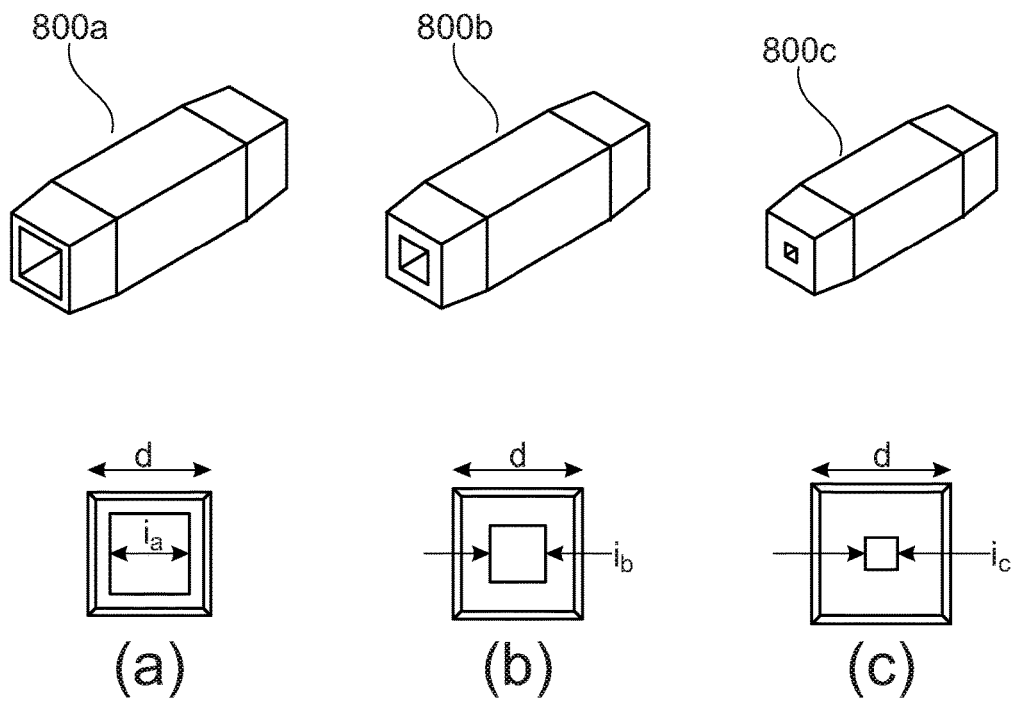
FIGS. 15a-c show flow adjusting inserts for a vacuum apparatus.

FIGS. 15a-c show tubular flow adjusting inserts 800a, 800b and 800c, for insertion into the internal cavity, or female connector, of a vacuum apparatus. The outer diameter d of each insert forms an interference fit with the cavity or female connector, whereas the inner diameters $i_a$, $i_b$ and $i_c$ vary to provide a desired degree of flow restriction downstream thereof (i.e. between the flow restrictor and the nearest vacuum port).

Figure 16:
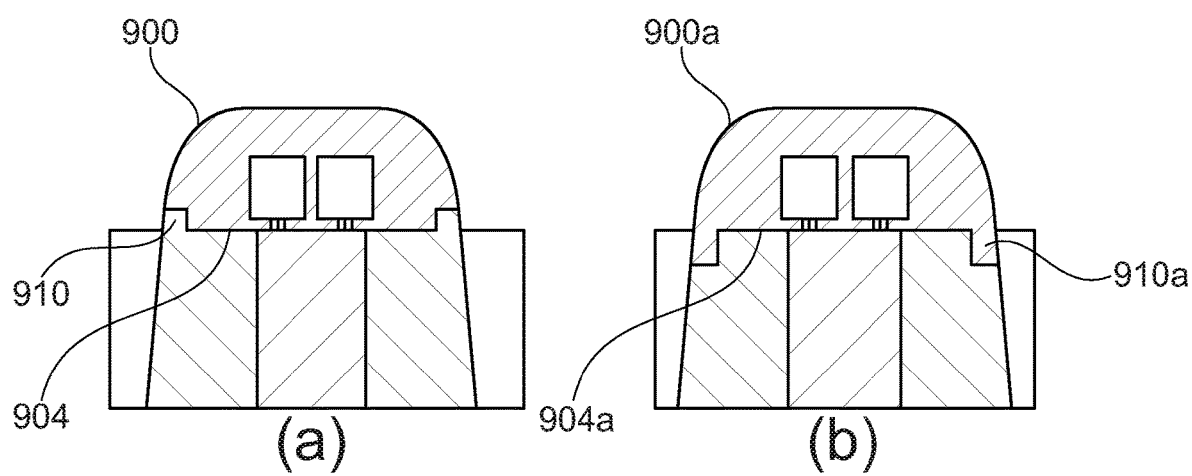
FIGS. 16a and 16b show cross sectional views of vacuum apparatus having alternative key formations.

FIGS. 16a and 16b show cross sectional view of alternative key formations, extending from the contact surfaces 904, 904a of apparatuses 900, 900a. Key formations 910a take the form of a lip extending down from the contact surface 904a, running lengthwise along at least a part of the length of the vacuum apparatus 900a. Key formations 910 take the form of a cut-out extending into the contact surface 904, running lengthwise along at least a part of the length of the vacuum apparatus 900.

Whilst exemplary embodiments have been described herein, these should not be construed as limiting to the modifications and variations possible within the scope of the invention as disclosed herein and recited in the appended claims.

The invention claimed is:

1. A method of applying a vacuum to a reinforcement lay-up in a vacuum bag; the method comprising;
   providing a reinforcement lay-up on a mould, the lay-up comprising a dry reinforcement material;
   providing a vacuum apparatus, the vacuum apparatus comprising:
      a vacuum port component having a vacuum port component body portion defining a contact surface and an internal cavity, the vacuum port component further comprising a vacuum port oriented away from the contact surface and in communication with the vacuum port component internal cavity;
      a vacuum component having a vacuum component body portion defining a contact surface and an internal cavity; wherein the vacuum component contact surface comprises a plurality of inlet apertures or one or more inlet slots extending therethrough and in communication with the vacuum component internal cavity;
      the vacuum port component and the vacuum component being connected or connectable to one another to place the respective internal cavities in fluid communication with one another and to provide a contiguous vacuum apparatus contact surface;
   connecting the vacuum port component to the vacuum component to place the respective internal cavities in fluid communication with one another;
   placing the contact surfaces of the vacuum port component and the vacuum component against the dry reinforcement material;
   coupling the vacuum port of the vacuum apparatus to a vacuum system through an aperture in a vacuum bag;
   sealing the vacuum bag to the mould around the reinforcement lay-up; and
   applying a vacuum to the reinforcement lay-up using the vacuum system, via the plurality of inlet apertures, or the one or more slots.

2. The method of claim 1, comprising laying up multiple plies of the dry reinforcement material on the mould.

3. The method of claim 1, comprising infusing the reinforcement lay-up with a matrix material while applying a vacuum via the vacuum apparatus.

4. The method of claim 1, comprising removing excess matrix material from the reinforcement lay-up, using the vacuum apparatus.

5. The method of claim 1, further comprising restricting a flow area through the internal cavity of at least one of the vacuum port component and the vacuum component.

6. The method of claim 5, wherein said restricting the flow area comprises inserting a flow restricting insert into said internal cavity of at least one of the vacuum port component and the vacuum component or into a connection sub-arrangement.

7. The method of claim 1, further comprising placing the contact surfaces against an edge of the reinforcement lay-up.

8. The method of claim 2, further comprising trimming the reinforcement lay-up to provide clean edges such that peripheral edges of the multiple plies are co-planar along a resulting edge.

9. The method of claim 1, further comprising: connecting the vacuum port component and the vacuum component of the vacuum apparatus with a connection arrangement, the connection arrangement having a channel therethrough, and by which the respective internal cavities are placed in fluid communication when the vacuum port component and the vacuum component are connected to one another.

10. The method of claim 1, further comprising laying up multiple plies of the dry reinforcement material on the mould.

11. A method of making a composite article, comprising applying a vacuum to a reinforcement lay-up in a vacuum bag in accordance with the method of claim 1, and infusing the reinforcement lay-up with a matrix material, while applying a vacuum via the vacuum apparatus.

12. The method of claim 11, comprising removing excess matrix material from the reinforcement lay-up, using the vacuum apparatus.

13. The method of claim 11, comprising preventing resin from entering at least a part of the vacuum apparatus, using semi-permeable membrane material applied to one or more said contact surfaces.

* * * * *